(12) United States Patent
Yoshida et al.

(10) Patent No.: US 6,577,314 B1
(45) Date of Patent: *Jun. 10, 2003

(54) CHARACTER GENERATION USING DATA OF PLURAL TYPES TO WHICH DIFFERING PRIORITIES ARE ASSIGNED

(75) Inventors: Masayuki Yoshida, Yokohama; Kunio Seto, Kawasaki, both of (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/625,304

(22) Filed: Apr. 1, 1996

Related U.S. Application Data

(63) Continuation of application No. 08/089,569, filed on Jul. 12, 1993.

(30) Foreign Application Priority Data

Jul. 14, 1992 (JP) ............................................. 4-187025

(51) Int. Cl.[7] ............................................. G06T 11/00
(52) U.S. Cl. ........................ 345/471; 345/467; 345/472
(58) Field of Search ................................. 395/150, 151; 345/141–144, 116, 124, 441–443, 467, 471, 472

(56) References Cited

U.S. PATENT DOCUMENTS

| | | | | |
|---|---|---|---|---|
| 4,298,945 A | * | 11/1981 | Kyte et al. .................. | 364/523 |
| 4,897,638 A | * | 1/1990 | Kokunishi et al. .......... | 340/751 |
| 4,931,953 A | * | 6/1990 | Uehara et al. ............... | 364/518 |
| 5,105,471 A | * | 4/1992 | Yoshida et al. ............... | 382/22 |
| 5,113,491 A | * | 5/1992 | Yamazaki ..................... | 395/141 |
| 5,155,805 A | * | 10/1992 | Kaasila ......................... | 395/151 |
| 5,159,668 A | * | 10/1992 | Kaasila ......................... | 395/151 |
| 5,257,016 A | * | 10/1993 | Fujii et al. ................... | 345/143 |
| 5,289,169 A | * | 2/1994 | Corfield et al. ............. | 340/144 |

FOREIGN PATENT DOCUMENTS

| | | |
|---|---|---|
| CN | 228581 | 8/1994 |
| JP | 1-166967 | 6/1989 |
| TW | 78106819 | 8/1990 |

OTHER PUBLICATIONS

English translation of claims 1–7 of Chinese document 228581, dated Aug. 1994.

* cited by examiner

Primary Examiner—Mark Zimmerman
Assistant Examiner—Lance W. Sealey
(74) Attorney, Agent, or Firm—Fitzpatrick, Cella, Harper & Scinto

(57) ABSTRACT

For generating characters form data stored in a vector format, are provided two kinds of based skeleton data and data which depends on type style; from this a plurality of type styles are generated. The base skeleton data has a start portion, a middle portion, and an end portion. (Or, the base skeleton data has skeleton priority data, skeleton connection data, face modification data, or stroke weight data.) When the type style is generated, bit map, byte map, outline coordinate type, or skeleton coordinate type is generated as desired, in accordance with an output request.

16 Claims, 22 Drawing Sheets

STROKE DATA FORMAT

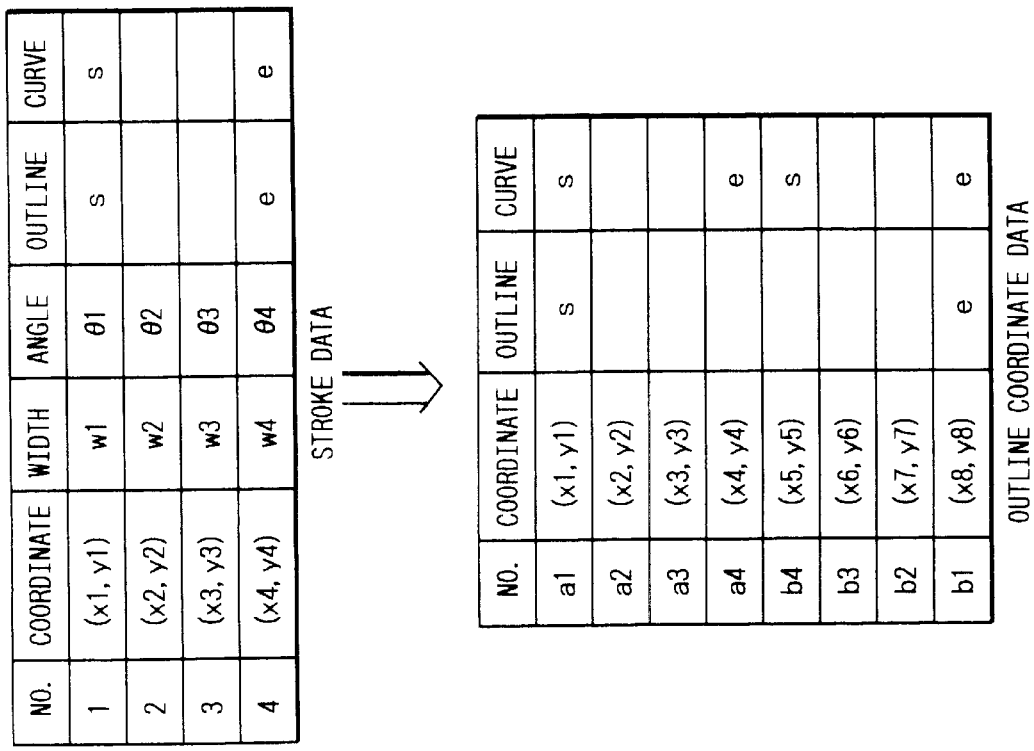
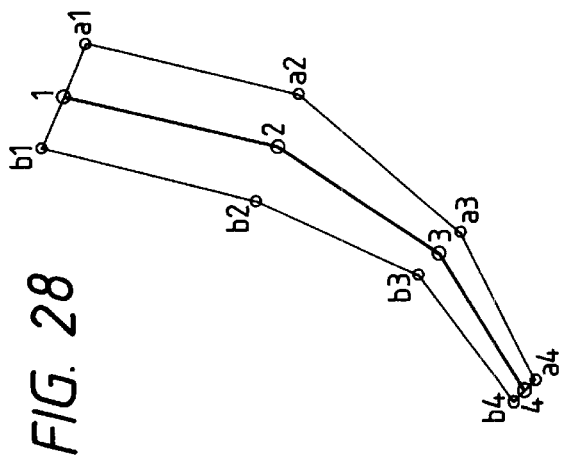
FIG. 28

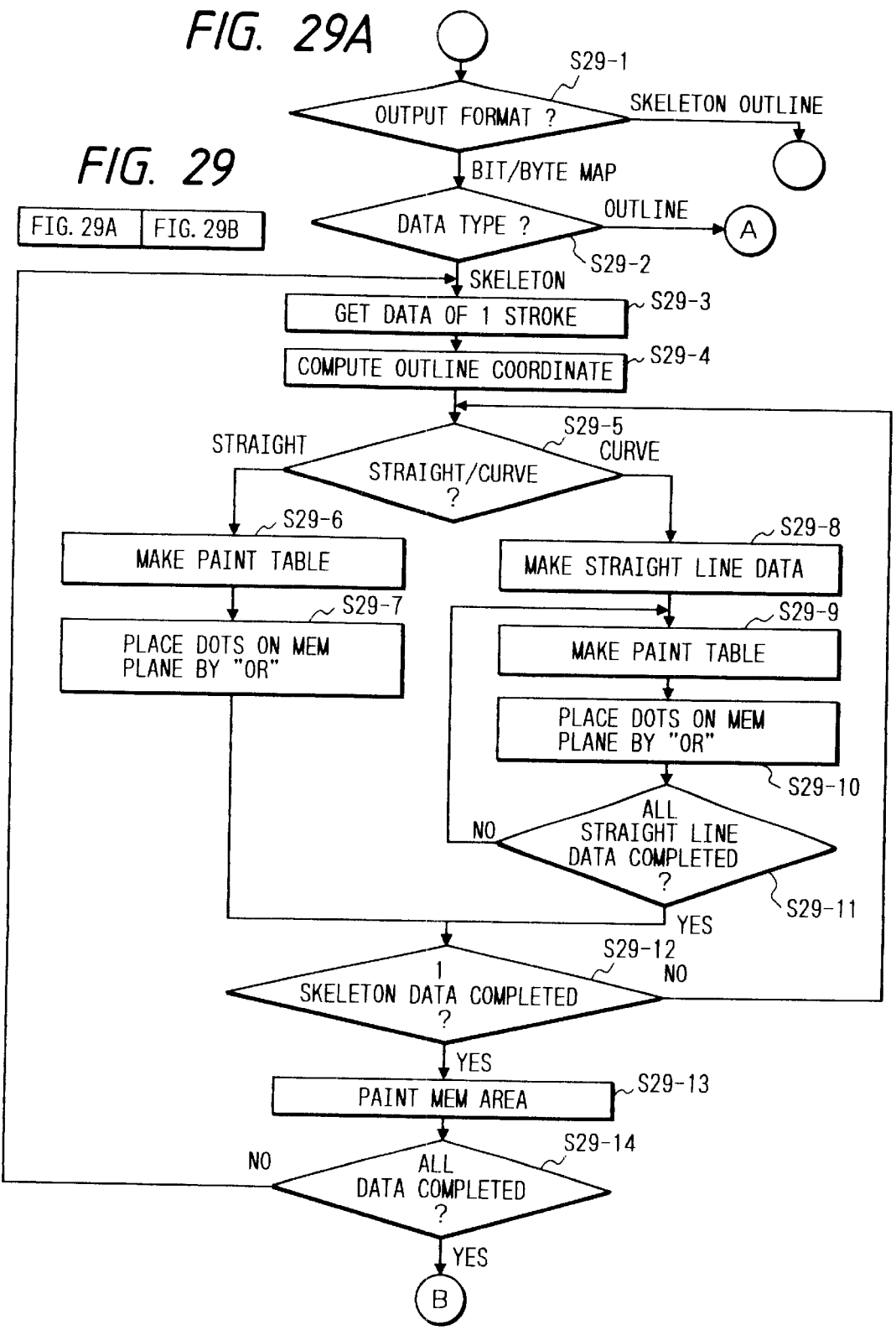

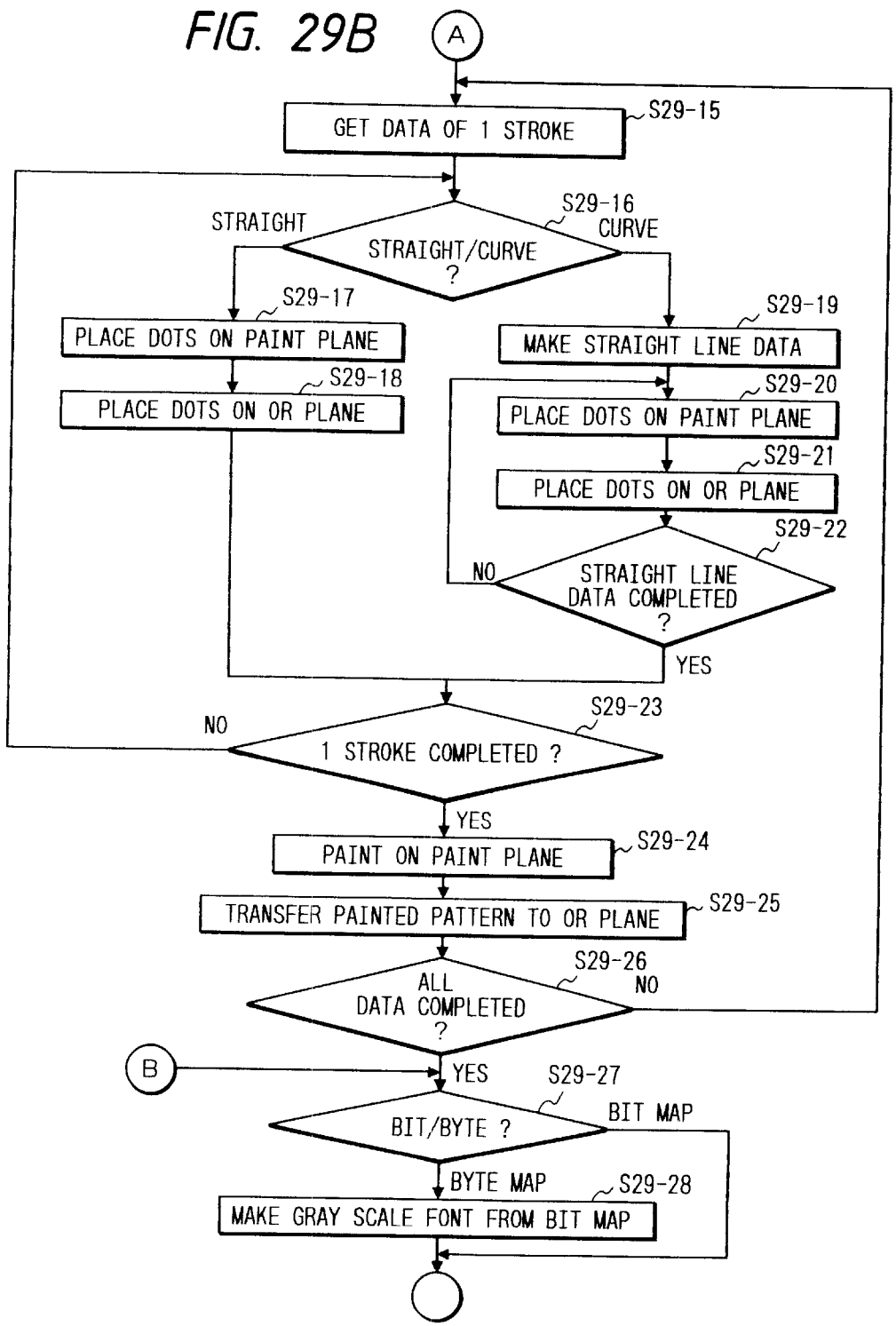

UNDER PAINTING

DOTS PLACED BY "OR"

| Y COOR-DINATE | X COOR-DINATE | X COOR-DINATE |
|---|---|---|
| y0 | x5 | x6 |
| y1 | x5 | x6 |
| y2 | x5 | x6 |
| y3 | x5 | x6 |
| y4 | x4 | x6 |
| y5 | x4 | x6 |
| y6 | x2 | x5 |
| y7 | x0 | x3 |

PAINT TABLE

CHARACTER GENERATION USING DATA OF PLURAL TYPES TO WHICH DIFFERING PRIORITIES ARE ASSIGNED

This application is a continuation, of application Ser. No. 08/089,569 filed Jul. 12, 1993.

BACKGROUND OF THE INVENTION

Field of the Invention

The present invention relates to a character generating method having a function to convert characters or the like which have been coded in a vector format, into data in a dot format.

Related Background Art

Hitherto, when a plurality of type styles or family are outputted, they are stored in a ROM on a type style unit basis (i.e., type style by type style) and, in an outputting mode, necessary data is taken out from an address of the requested type style stored in the ROM, with reference to the content of the requested type style, and data of a bit map format is formed from data in a vector format and is generated.

In the above conventional example, however, when the number of type styles is small, the needed memory capacity of the ROM is not excessively large. However, when the number of type styles increases and families must be prepared in correspondence to them, there is a problem in that the required capacity of the ROM is extremely large, and such a large ROM is not practical for inclusion in a marketable product.

There is also a problem in that, in a case where the data type on the development requesting side is one type, e.g., outline type or stroke type, the apparatus, if prepared only to handle another type (e.g., stroke type or another type, respectively), maybe unable to accommodate the development request.

SUMMARY OF THE INVENTION

In consideration of the above points, to solve the above problems, it is an object of the invention to provide a system that can handle both base stroke data and type style data and for which, it is sufficient to prepare only one kind of data, e.g., base stroke data, irrespective of the number of type styles, and by providing as many type style data as the number of type styles to be accommodated, the capacity of ROM that is installed in a product can be reduced without a concurrent reduction in output quality.

Another object of the invention is to make it possible to perform a character development according to a request by covering from stroke type data to outline type data.

Still another object of the invention is to provide a character generating method whereby, where characters are generated from data stored in a vector format, provision of two kinds of data including base skeleton data and data which depends on the type style, permits generation of a plurality of type styles.

BRIEF DESCRIPTION OF THE DRAWINGS

FIG. 28 is a diagram showing a state in the case where data of (skeleton+thickness) is changed to data of the outline type on a stroke unit basis;

FIG. 29 is comprised of FIGS. 29A and 29B showing flowcharts to form data from the vector type data in step 23-4 in the flowchart of FIG. 23;

DETAILED DESCRIPTION OF THE PREFERRED EMBODIMENTS

An embodiment of the present invention will now be described.

The invention can be accomplished by a system a comprising a plurality of apparatuses or can be also accomplished by an apparatus comprising one apparatus. The invention is also applied to the case where the invention is accomplished by supplying programs based on a method of the embodiment to a system or an apparatus.

Figure 1:
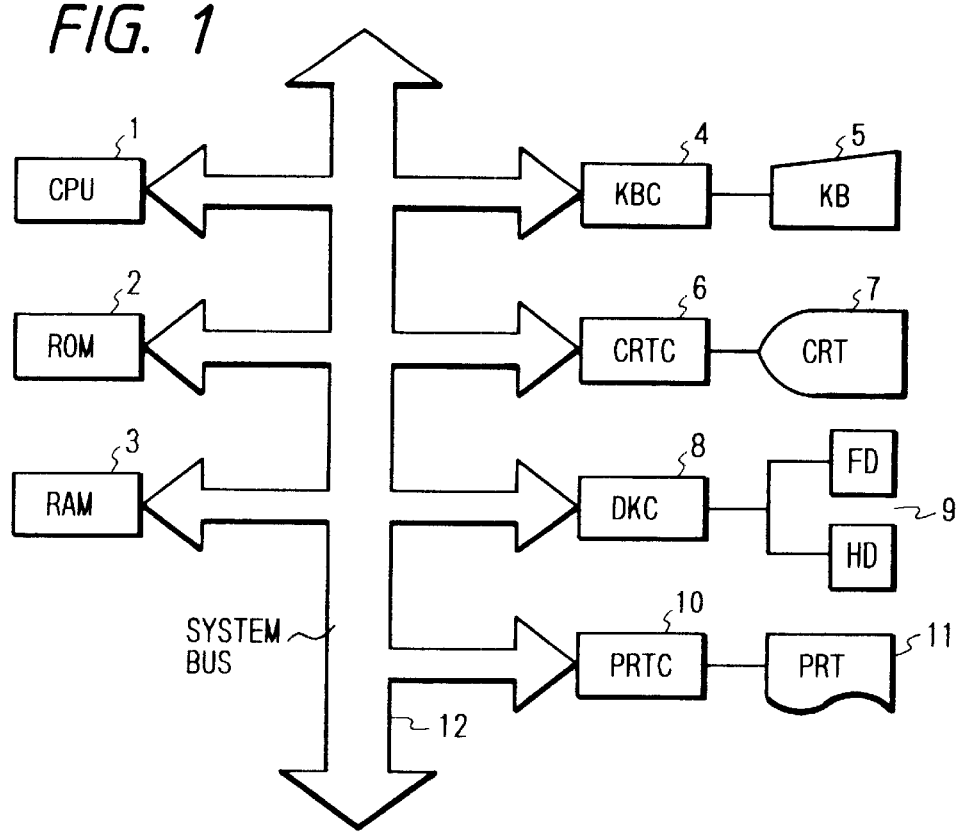
FIG. 1 is a block diagram showing an internal construction of a preferred embodiment of the invention.

FIG. 1 is a block diagram showing a fundamental construction of the system according to the invention. The system can be constructed by a Japanese word processor, a work station, or a computer system. In FIG. 1, reference numeral 1 denotes a CPU (central processing unit) to control the whole apparatus and to execute arithmetic operation processings and the like; 2 a ROM (read only memory) serving as a memory area to store a system activating program, character pattern data, and the like; 3 a RAM (random access memory) serving as a data memory area whose use is not limited and into which each program and data are loaded for each processing, and the program is executed; 4 a KBC (keyboard control section) which receives key input data from a KB (keyboard) 5 and transmits that data to the CPU 1; 6 a CRTC (display control section); 7 a CRT (display apparatus) which receives data from the CRTC 6 and displays that data; and 9 an external memory device such as an FD (floppy disk device) or HD (hard disc device) or the like. The programs and data are stored into the memory device 9 and are referred or loaded into the RAM as necessary upon execution. Reference numeral 8 denotes a DKC (disk control section) to control data transmission and the like; 10 a PRTC (printer control section); 11 a PRT (printer); and 12 a system bus serving for passage of the data among the above component elements.

Figure 2:
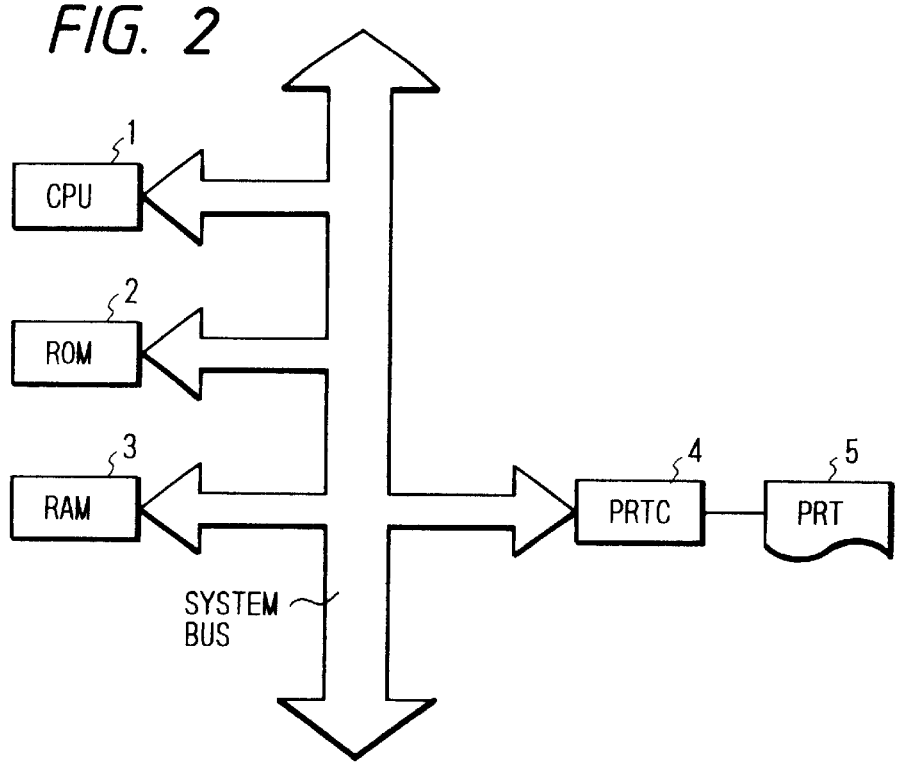
FIG. 2 is a block diagram showing the internal construction of another embodiment of the invention.

FIG. 2 is a block diagram showing a fundamental construction of the system according to the invention. The system can be constructed by a laser beam printer, a bubble jet printer, or an output apparatus of the thermal copy transfer type or the like. In FIG. 2, reference numeral 1 denotes the CPU (central processing unit) to control the whole apparatus and to execute arithmetic operation processings and the like; 2 the ROM (read only memory) serving as a memory area to store system activating programs, character pattern data, and the like; and 3 the RAM (random access memory) serving as a data memory area whose use is not limited. Each program and data are loaded into the RAM 3 for each process and the program is executed.

Reference numeral 10 denotes the PRTC (output control section) and 11 the PRT (output apparatus) which receives data from the PRT 10 and displays.

Figure 3:
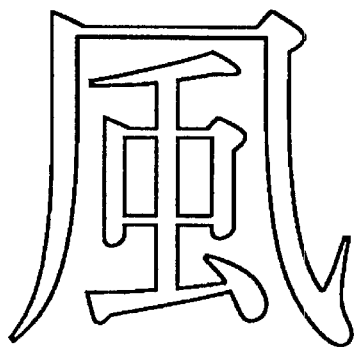
FIG. 3 is a diagram showing type style and a its skeleton.
Figure 4:
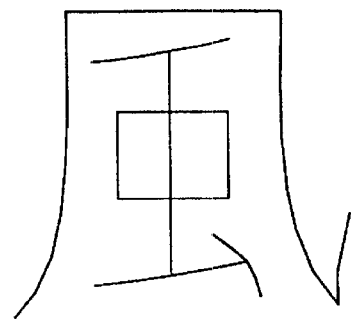
FIG. 4 is a diagram showing type style and a its skeleton.
Figure 5:
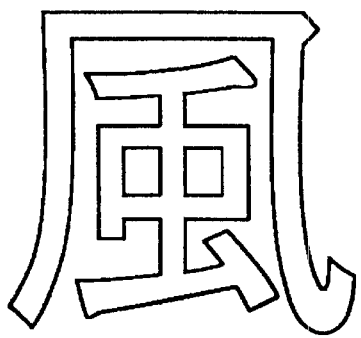
FIG. 5 is a diagram showing type style and a its skeleton.
Figure 6:
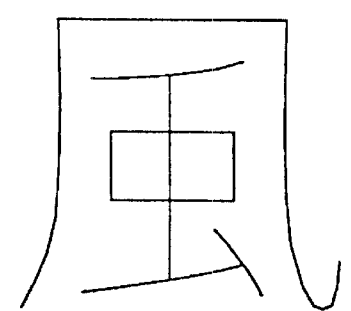
FIG. 6 is a diagram showing type style and a its skeleton.
Figure 7:
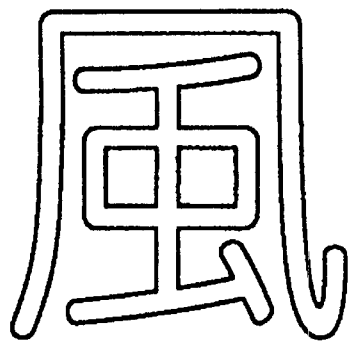
FIG. 7 is a diagram showing type style and a its skeleton.
Figure 8:
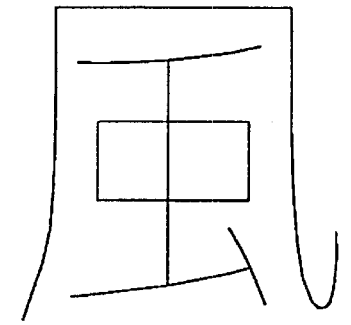
FIG. 8 is a diagram showing type style and a its skeleton.
Figure 9:
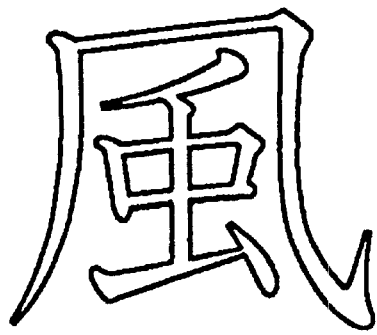
FIG. 9 is a diagram showing type style and a its skeleton.
Figure 10:
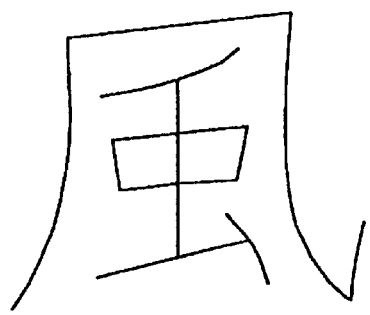
FIG. 10 is a diagram showing a type style and its skeleton.
Figure 11:
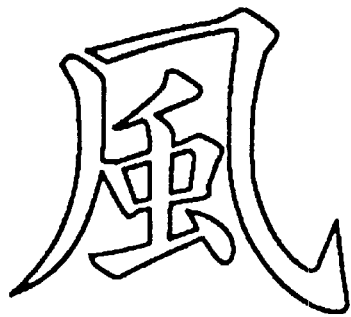
FIG. 11 is a diagram showing a type style and its skeleton.
Figure 12:
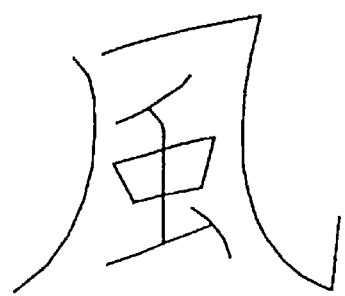
FIG. 12 is a diagram showing a type style and its skeleton.

The embodiment of the invention will now be described in detail hereinbelow. First, a structure of fundamental data will be explained. FIGS. 3 to 12 show final character shapes of a character "風" (which reads "kaze" and means "wind") of a Chinese character as an example and also show skeletons of the final character shapes, respectively. FIGS. 3 and 4 show the final character shapes of a Ming style and their skeletons. In a manner similar to the above, FIGS. 5 to 12 show examples of a Gothic style I, a Gothic style II, a text style, and a print hand type. When a general vertical line is considered as an example, the Ming style, Gothic style I, and Gothic style II show straight lines. In the case of the print hand style, however, a curve is used in a writing start portion. Similarly, a horizontal line of the print hand style has a delicate curvature.

Figure 13:
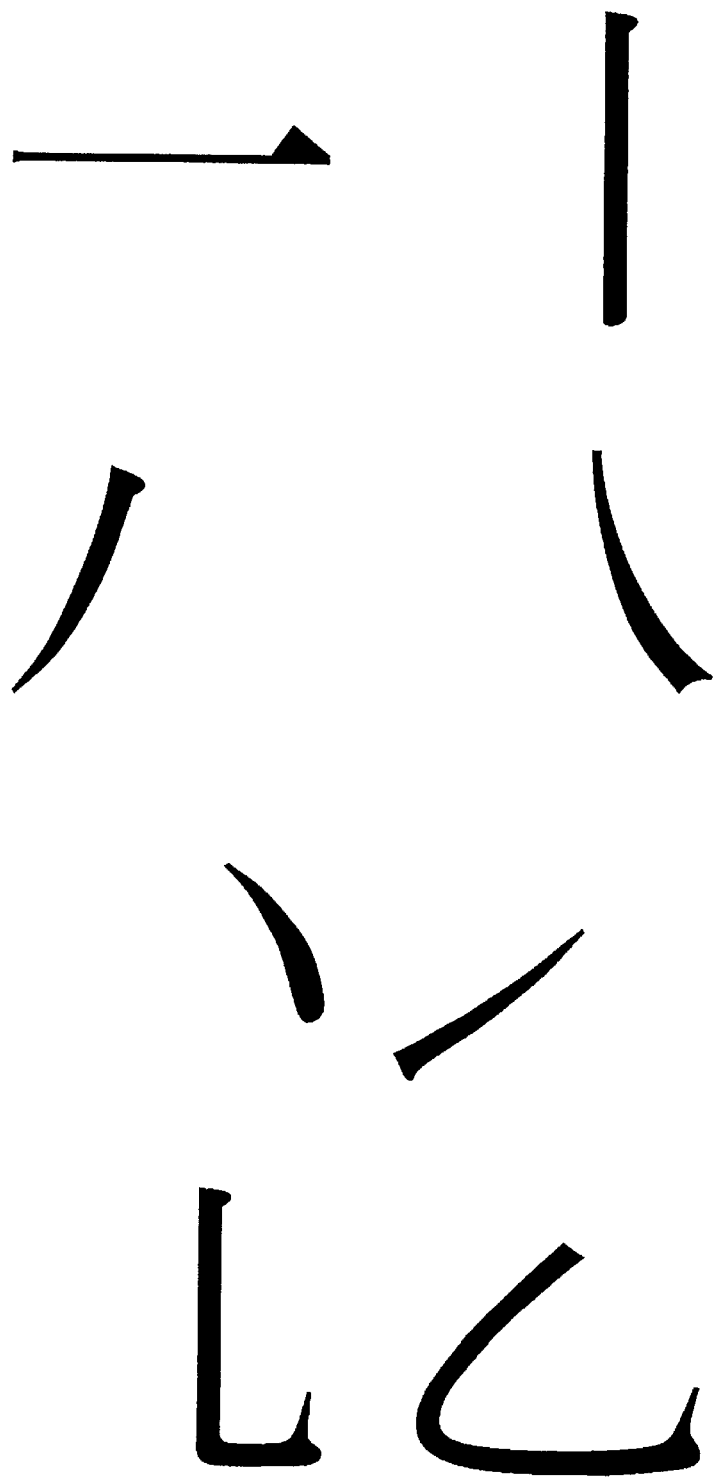
FIG. 13 is a diagram showing a basic shape of stroke data.

FIG. 13 shows fundamental shapes of stroke data. In the preferred embodiments, the fundamental shapes of stroke are classified into eight kinds, which are called as follows: "VERTICAL", "HORIZONTAL", "VERTICAL-LEFT BOTTOM", "VERTICAL-RIGHT BOTTOM", "POINT", "SPLASH", etc.

Figure 14:
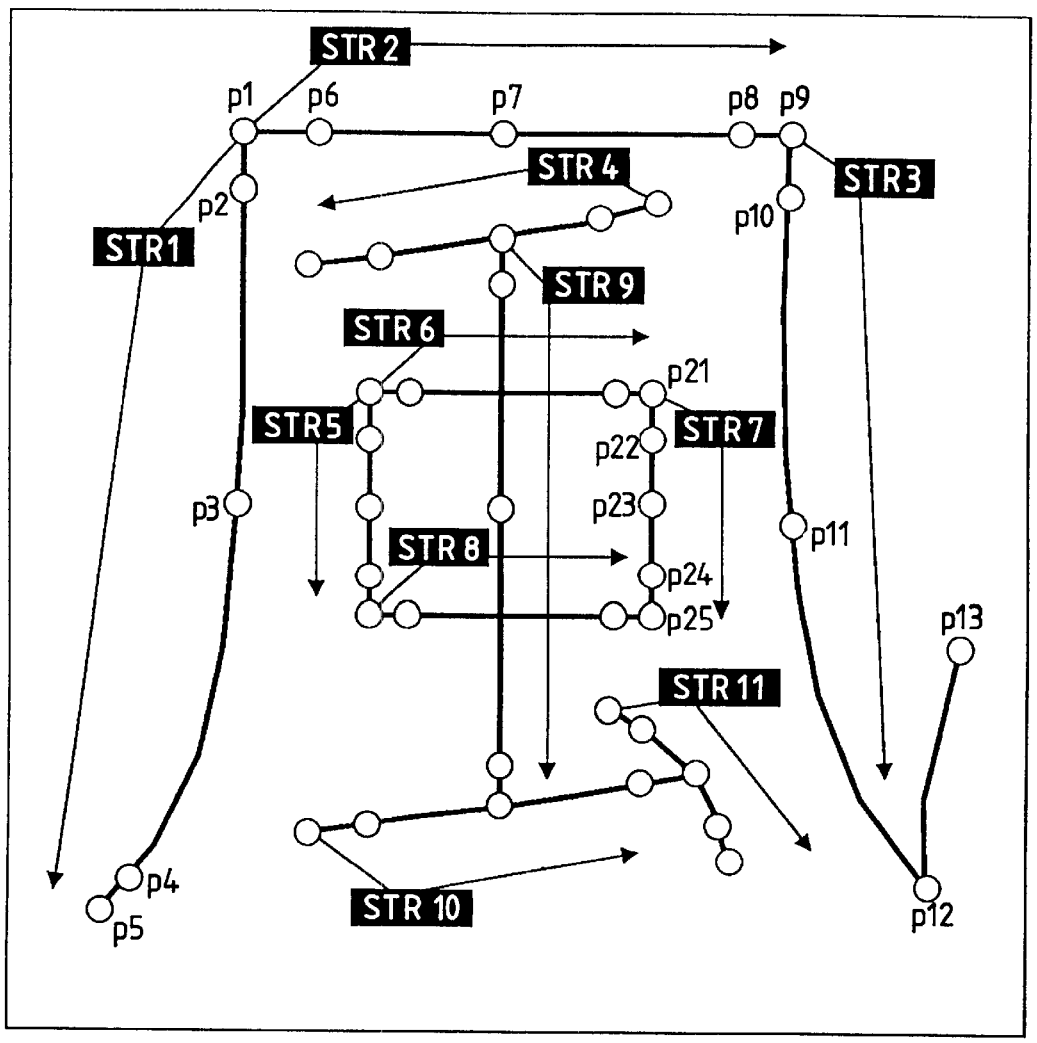
FIG. 14 is a diagram showing base skeleton data.
Figure 15:
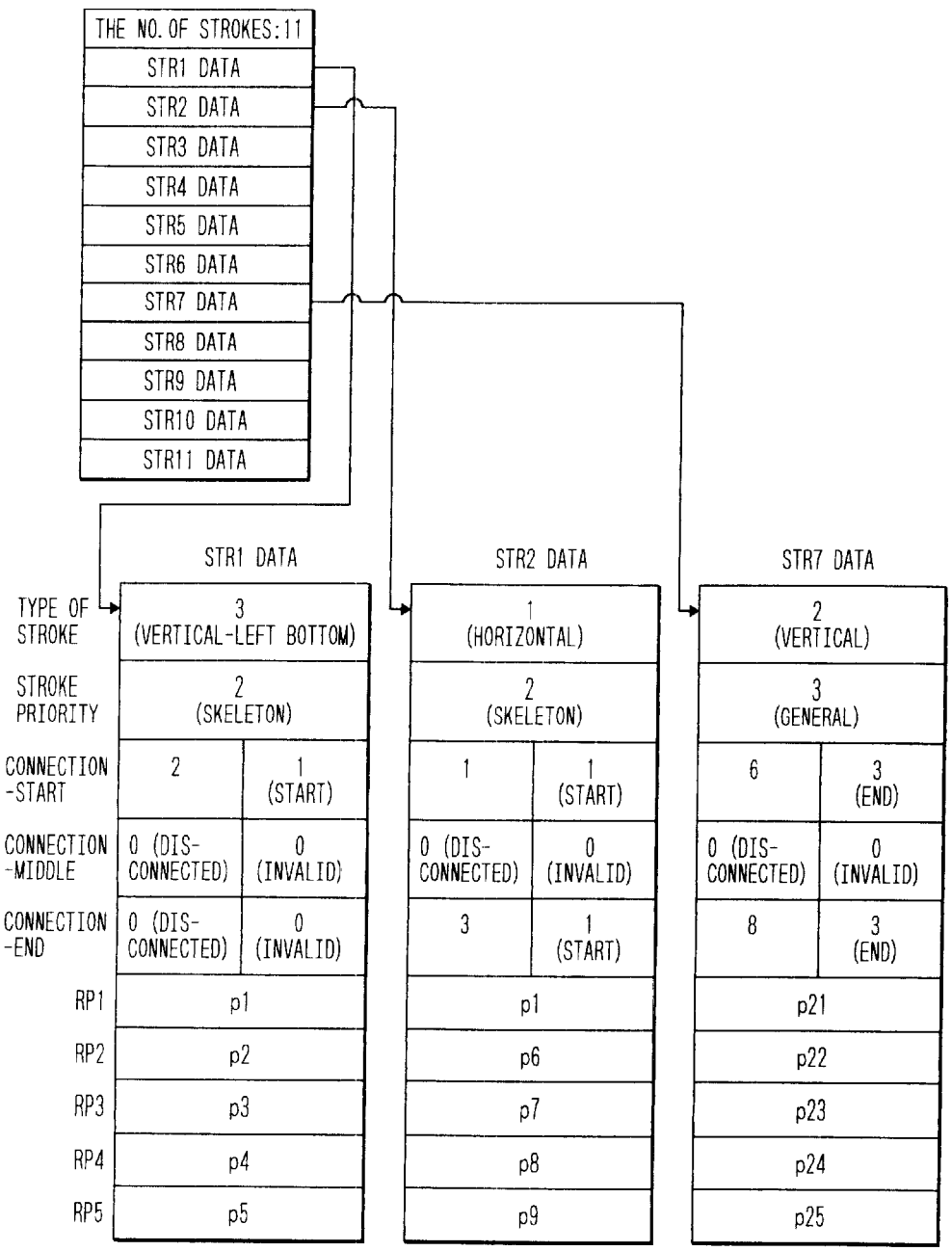
FIG. 15 is a diagram showing a format of the base skeleton data.

Base skeleton data of "風" as an example will now be described with reference to FIG. 14. FIG. 15 shows the contents of such data. "風" is constructed by eleven strokes STR1 to STR11. Each of the strokes will be explained hereinbelow. Five coordinate reference point data (hereinafter, referred to as RP data) are provided in order to adapt the stroke data of each type style. For instance, STR1 has the points p1, p2, p3, p4, and p5. STR2 has the points p1, p6, p7, p8, and p9. The above five coordinate reference points respectively indicate start point reference data (hereinafter, referred to as RP1), start point—middle portion connection point-reference data (hereinafter, referred to as RP2), stroke center portion reference data (hereinafter, referred to as RP3), middle portion—end portion connection point reference data (hereinafter, referred to as RP4), and end point reference data (hereinafter, referred to as RP5).

Each of the stroke data constructing each character has the stroke sequence No. of the character, a type of stroke, a stroke priority, connection data (-start, -middle, -end), and RP data.

The type of stroke indicates the type such as "horizontal", "vertical", or the like by number. For example, "1" is stored in the case of a horizontal line and "2" in the case of a vertical line. The stroke priority indicates which degree of significance the corresponding stroke has in the character. For example, the stroke priority has the values of 1 to 5 from high to low significance. It is now assumed that those values are classified such that 1 denotes a very thick line, 2 a skeleton line, 4 a thin line, 5 a very thin line, and 3 a general line which corresponds to none of those line widths 1, 2, 4, and 5. The skeleton line indicates an outline of the character, a long image which passes through the center of the character, or the like. The thickest line is adapted to the case of a stroke of a character such as "—", "人", or the like which is very simple and is constructed by a small number of strokes. The connection data denotes that each of the start portion, middle portion, and end portion the in contact with another stroke or is independent by only the stroke. When it is independent, the value 0 is stored. When it is in contact with another stroke, the portion of the stroke which is in contact with the sequence No. of such a stroke, namely, data indicative of start portion, middle portion, or end portion is stored. For example, 1 is stored in case of the start portion, 2 is stored in case of the middle portion, and 3 is stored in case of the end portion. As RP data, the five coordinate reference point data mentioned above are stored by the coordinate values (x, y) in the coordinate form in which the character has been defined.

Figure 16:
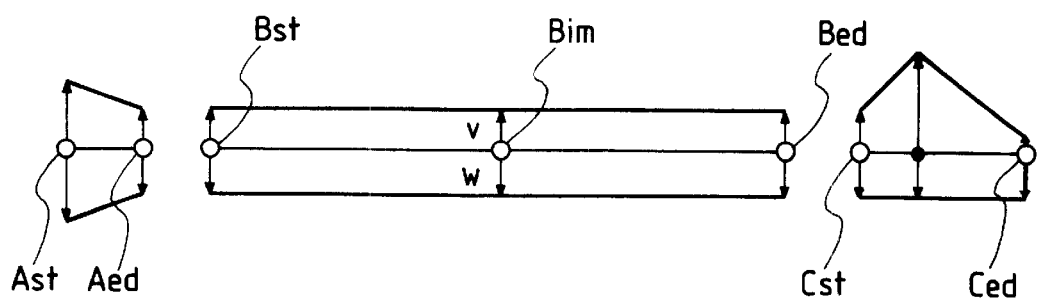
FIG. 16 is a diagram of stroke data of a horizontal stroke of a Ming style.
Figure 17:
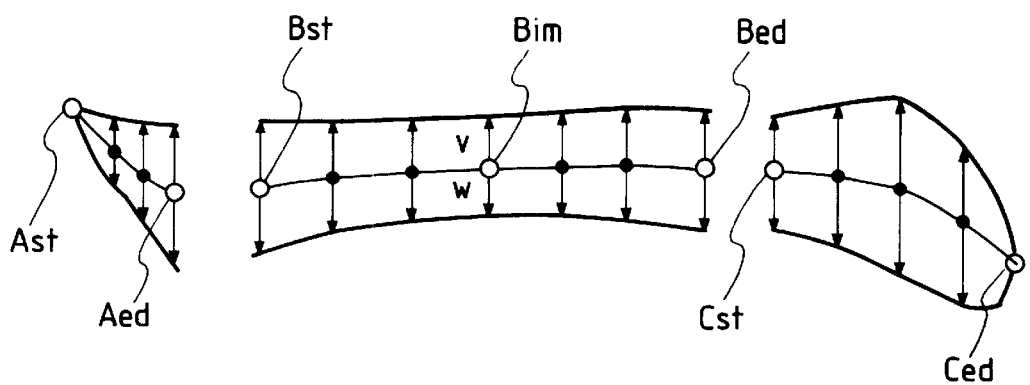
FIG. 17 is a diagram of stroke data of a horizontal stroke of a print band style.

FIGS. 16 and 17 are diagrams for explaining the contents of the stroke data of every type style in the case of a horizontal stroke as an example. The former shows an example of the Ming style. The latter shows an example of the print hand style. In FIG. 16, the start portion has two data Ast and Aed, the middle portion has three data Bst, Bim, and Bed, and the end portion has three data Cst, one intermediate control point, and Ced. Each of the start, middle, and end portions has relative (x, y) coordinate values and relative standard thickness values (v, w). The above data defines a practical shape of each base stroke for every type style. Each control point Ast, Aed, Bst, Bim, Bed, Cst, and Ced is linked with RP1 to RP5 of the base stroke data shown in FIG. 15. FIG. 17 shows an example of a print hand style. Stroke coordinate data Ast, Aed, Bst, Bim, Bed, Cst, and Ced and the other control coordinate data are stored.

Figure 19:
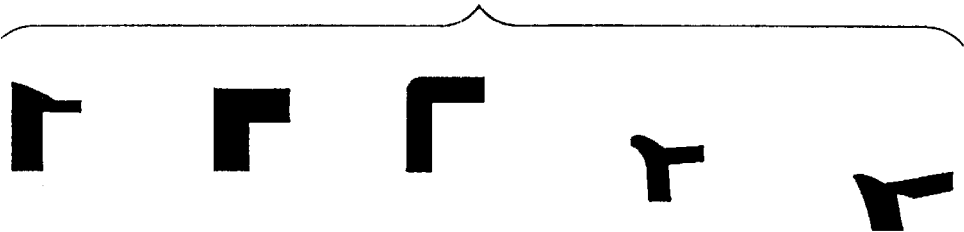
FIG. 19 is a diagram showing connection states of stroke data.
Figure 20:
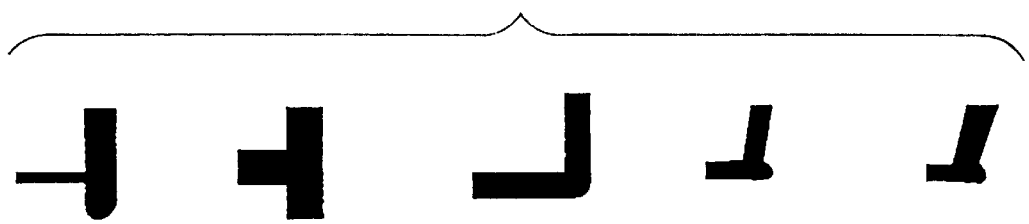
FIG. 20 is a diagram showing connection states of stroke data.

The above data further defines shape information of the connecting portion of the base stroke. FIGS. 19 and 20 are diagrams for explaining the connecting portion of the horizontal start portion and the vertical start portion. Since those connection data have been stored in the start, middle, and end portions of the base skeleton data portion, those portions are connected by accessing each of the data as a target with reference to the stored connection information. The details will be described with reference to a flowchart of FIG. 24.

Figure 18:
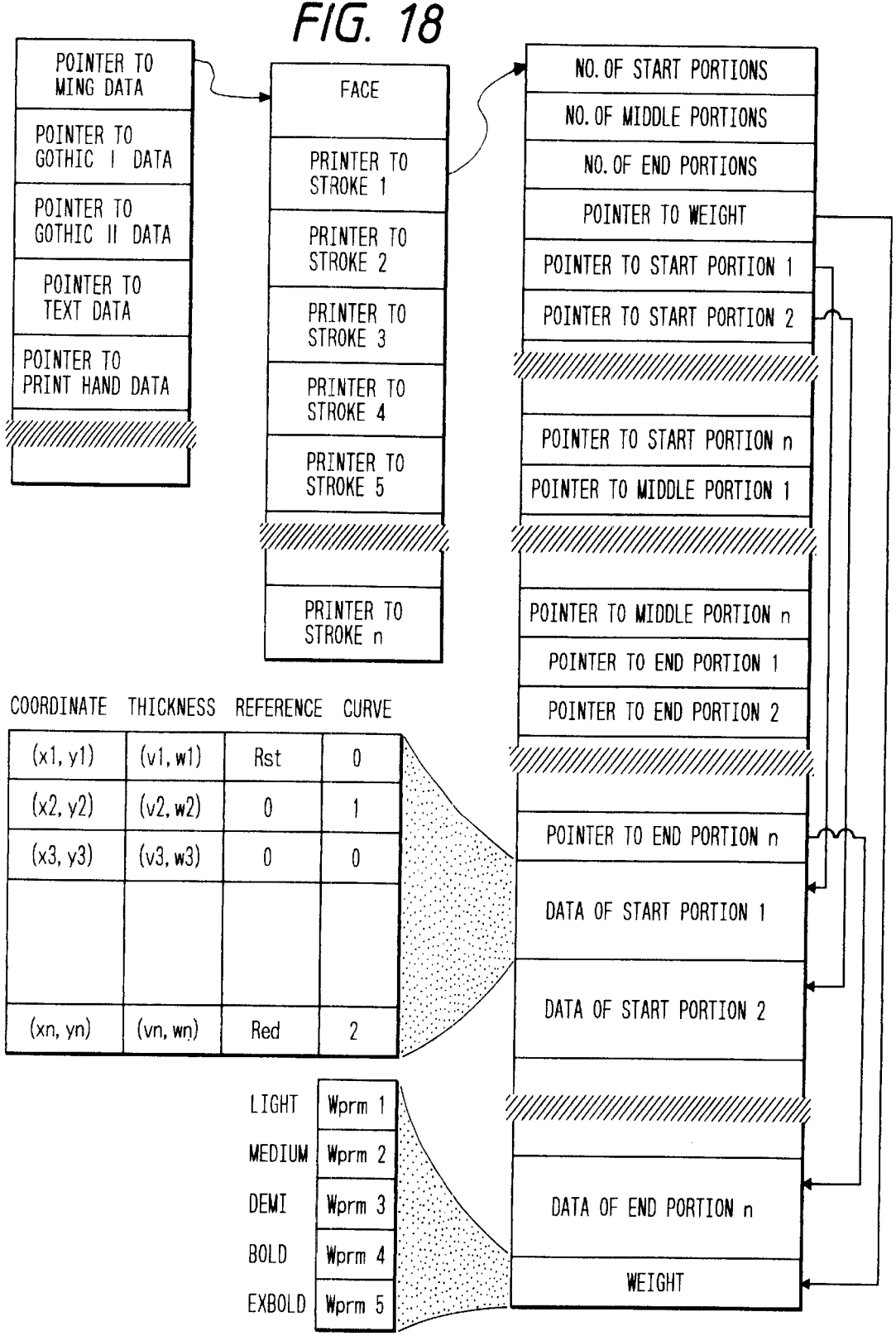
FIG. 18 is a diagram showing a format of type style data.

FIG. 18 shows a format of type style data. As type style data, individual data is provided for each type style and pointer data such as Ming style, Gothic style, or the like is provided. When tracing pointers of each type style, the pointers to face data and stroke data have been stored. The face data is used to change a shape of face of the type style (or will be explained in detail below in connection with the flowchart of FIG. 24). As for the pointer to the stroke data, the address in which the data of each stroke has been stored is stored. When tracing the pointers to each stroke data, the actual stroke data has been stored. As stroke data, the number of start portions, the number of middle portions, the number of end portions, the pointer to a weight portion, and the pointer to each data portion has been stored. The data portion comprises the coordinate data, thickness data, and reference data and curve data which are linked with the base skeleton data. As weight data, coefficient parameters for Light, Medium, Demi, Bold, and ExBold thicknesses have been stored.

Figure 23:
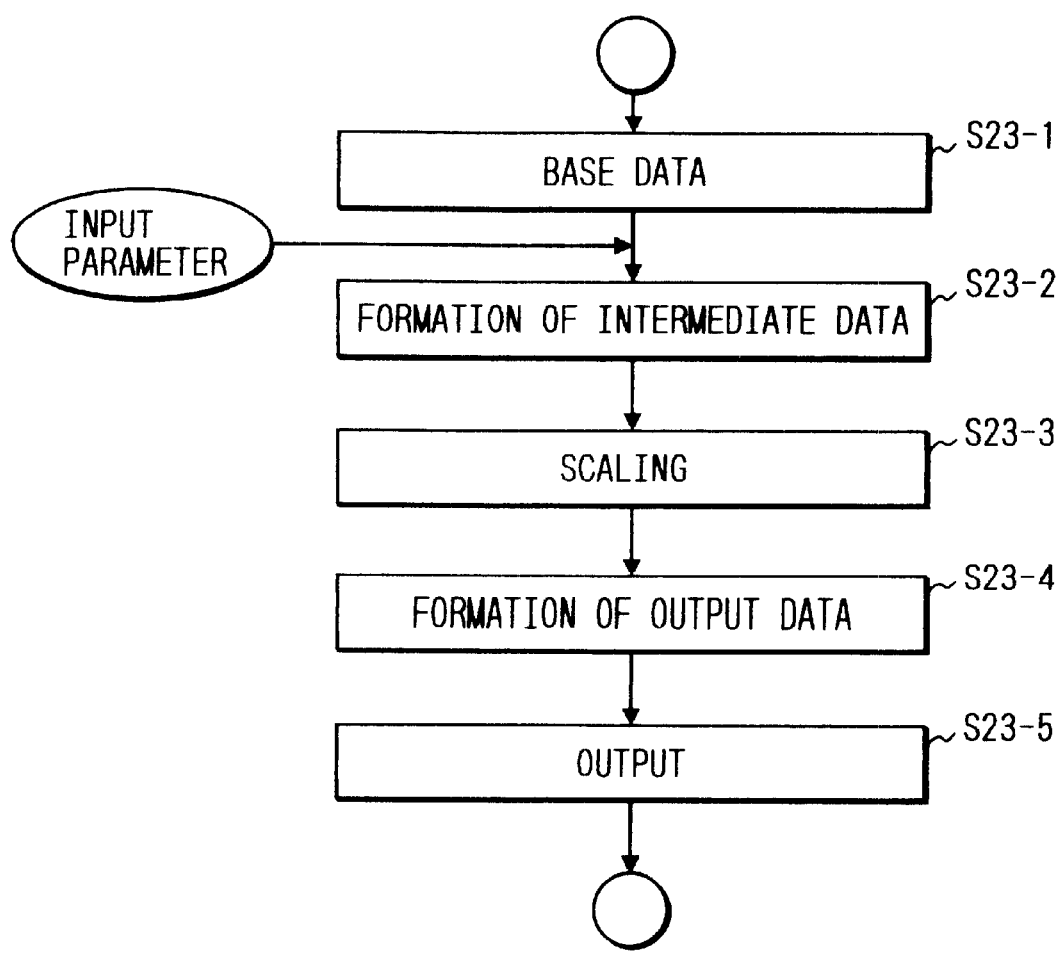
FIG. 23 is a flowchart showing a whole flow of the invention.
Figure 24:
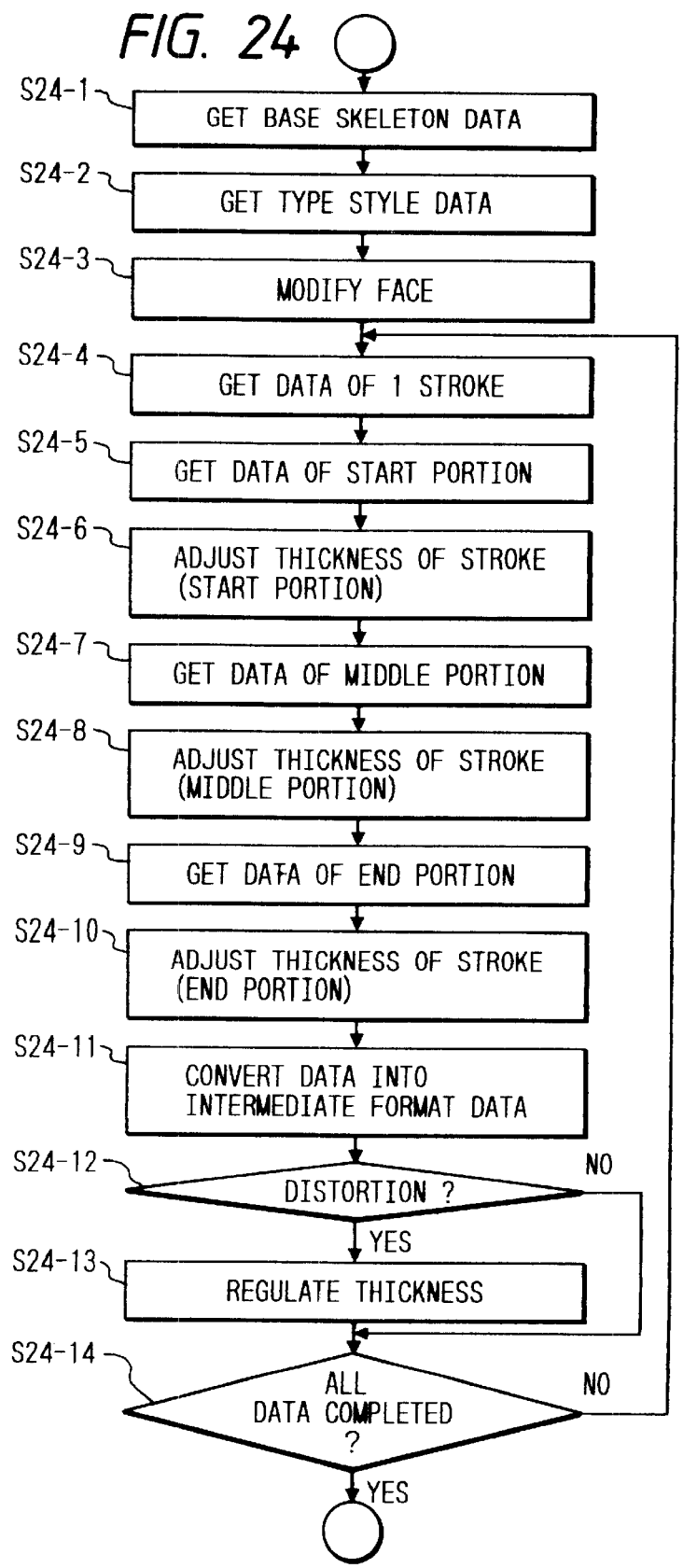
FIG. 24 is a flowchart for processings until the formation of intermediate format data.
Figure 26:
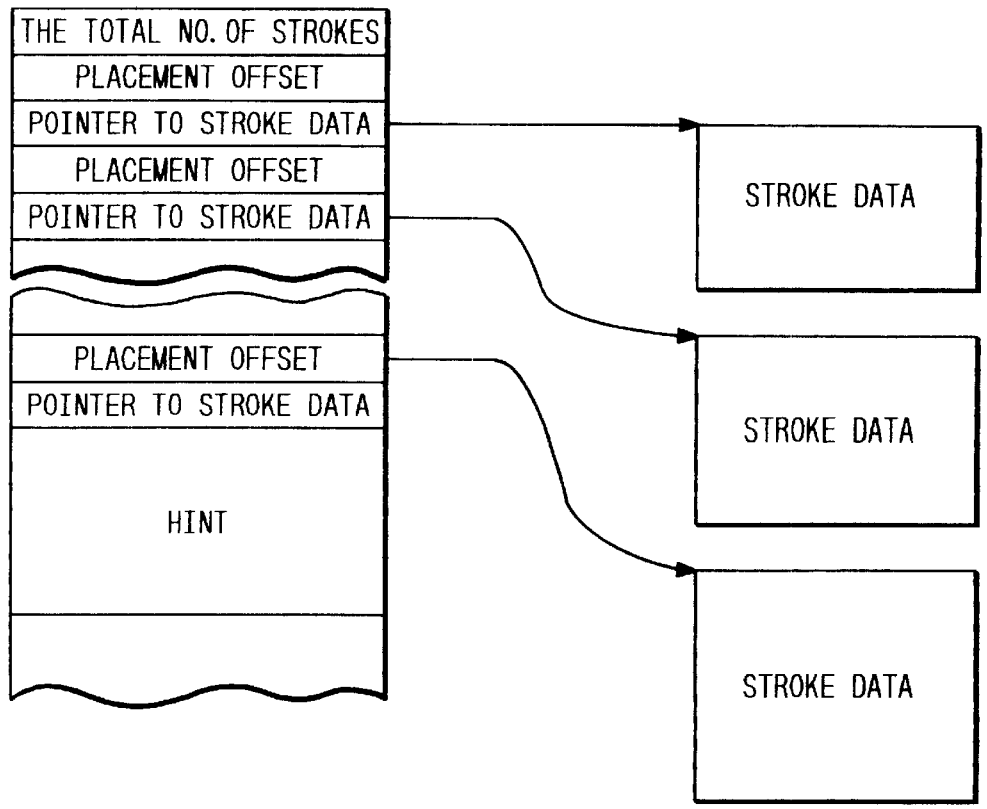
FIG. 26 is an explanatory diagram of intermediate format data.

A procedure to actually develop the character data from the character data comprising the base skeleton data and the type style data as mentioned above will now be described. As input parameters in FIG. 23, there are a character code, a type style, weight data of the family to which the character of the generated belongs, an output size an output format, and the like. The character code is a code of a character to be actually generated and ordinarily conforms with the JIS. The type style shows a character format such as Ming style, Gothic style, or the like. The weight data of the family is used to control thicknesses of strokes such as thick, middle thick, middle, middle thin, thin, and the like in the designated type style. The output size designates the point size or the size of actual bit map. The output format is a format such as bit map, gray scale (byte map), outline coordinate data, skeleton coordinates+thickness data, or the like that is demanded when the output side generates a character. Character data is actually formed from the base data and input parameters mentioned above. In step S23-2 in FIG. 23, the data comprising the base skeleton data and the type style data is modified into an intermediate data format as shown in FIG. 26. The intermediate data format is such that both the designated type style and the family data have already been analyzed and replaced with actual coordinate values. By the intermediate data format, the subsequent processings are controlled. The flowchart shown in FIG. 24 shows a method of forming an intermediate data format from the base skeleton data and type style data. In step S24-1, the base skeleton data of a character to be accessed from now on is read. In this instance, the data has already been stored in the ROM, RAM, hard disc, floppy disk, or the like. In step S24-2, the type style data of the target character is read. In a manner similar to the base skeleton data, the type style data has also already been stored in the ROM, RAM, hard disc, floppy disk, or the like.

Figure 25:
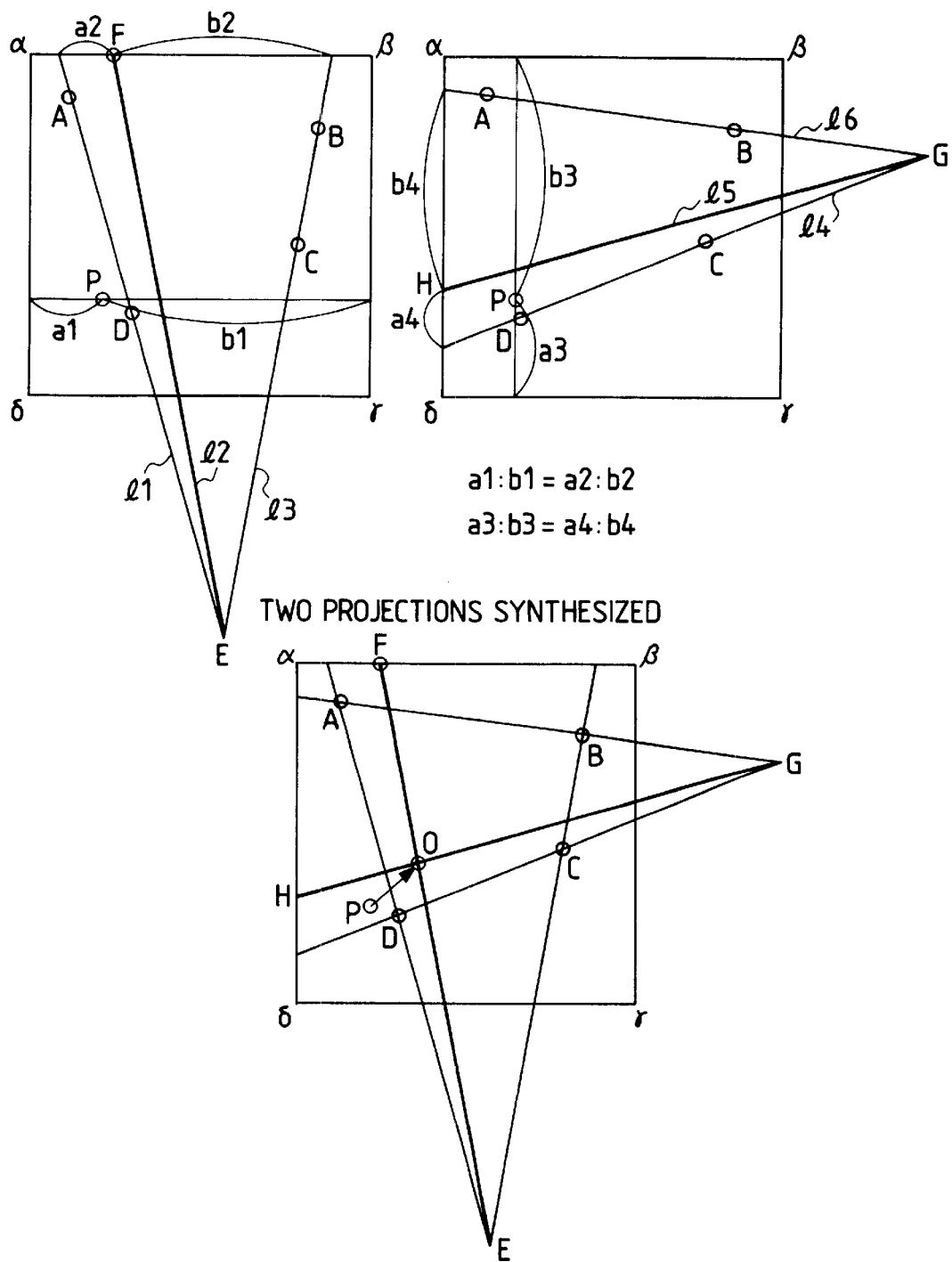
FIG. 25 is a calculation diagram for use in changing a character face.

In step S24-3, the shape of face of the base skeleton data is converted. Since the faces of base strokes are not always unified for all of the type styles, the shape of face of each type style must be modified. Since the modification data of the faces has already been stored as face data of the type style data, the modification data is derived by accessing the face data. A procedure to modify the shape of face as a master to change the type style will now be described with reference to FIG. 25 as an example. In FIG. 25, a region surrounded by $\alpha$, $\beta$, $\gamma$, and $\delta$ shows a face before modification. A region surrounded by A, B, C, and D shows values which have already been included in the type style parameters. A mapping process from the region surrounded by $\alpha$, $\beta$, $\gamma$, and $\delta$ into the region surrounded by A, B, C, and D is executed. As a mapping method in this case, explanation will now be made with respect to into which location in the region surrounded by A, B, C, and D a point P in the region surrounded by $\alpha$, $\beta$, $\gamma$, and $\delta$ is mapped. Now, assuming that A(ax, ay), B(bx, by), C(cx, cy), and D(dx, dy) and that a straight line AD is set to 11 and a straight line BC is set to 13, 11 and 13 are obtained by the following equations.

$$y=\{(ay-dy)/(ax-dx)\}\times(x-ax)+ay \qquad :11$$

$$y=\{(by-cy)/(bx-cx)\}\times(x-bx)+by \qquad :13$$

To obtain the coordinates E of the crossing point of the straight lines 11 and 13, it is sufficient to solve the equations for x and y. Although a method of solving the equations is omitted here, the point coordinates obtained assume the values E(ex, ey). When considering to which location the point P is mapped, a consideration is first made with regard to which straight line is formed by a line segment which passes through the point P and is parallel with a straight line $\alpha\delta$. Since a ratio $a_1:b_1$ as shown in the diagram ought to be constant after completion of the modification, a point F(fx, fy) such that the straight lines 11 and 13 cross straight line $\alpha\beta$ and its internally dividing point is set to $a_1:b_1$ is obtained. By obtaining a straight line EF, a locus having a possibility such that the point P after the modification passes is obtained. Such a locus 12 is obtained by the following equation:

$$y=\{(ey-fy)/(ex-fx)\}\times(x-ex)+ey \qquad :12$$

Thus, the straight line which passes through the point P and is parallel with the straight line $\alpha\beta$ can be known. A locus of the straight line which passes through the point P and is parallel with the straight line $\alpha\beta$, passes is obtained. First, coordinates G of the crossing point of the straight lines AB and DC are obtained. Now, assuming that the straight lines AB and DC are set to 14 and 16, respectively, the lines 14 and 16 are obtained by the following equations.

$$y=\{(ay-by)/(ax-bx)\}\times(x-ax)+ay \qquad :14$$

$$y=\{(cy-dy)/(cx-dx)\}\times(x-cx)+cy \qquad :16$$

The crossing point coordinates G(gx, gy) are obtained by solving the equations regarding x and y. The line segment which passes through the point P and is parallel with the straight line $\alpha\beta$ is a line segment which always internally divides the lines 14 and 16 in the ration $a_3:b_3$. Therefore, a point H(hx, hy) such that the straight lines 14 and 16 cross the straight line $\alpha\delta$ and its internally dividing point is set to $a_3:b_3$ is obtained, and a straight line GH is obtained, so that a locus having a possibility such that the point P after the modification passes, is obtained. The locus 15 is obtained by the following equation:

$$y=\{(gy-hy)/(gx-hx)\}\times(x-gx)+gy \qquad :15$$

Figure 21:
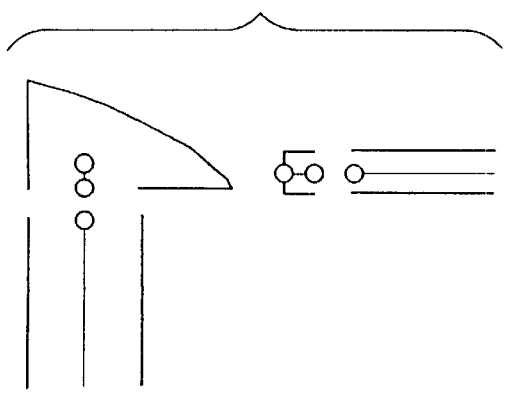
FIG. 21 is a detailed diagram showing connection states of stroke data.
Figure 22:
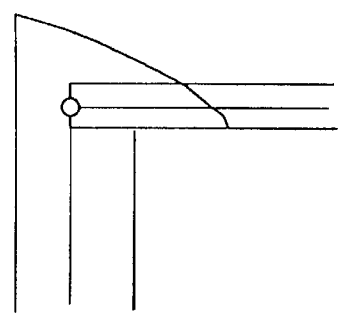
FIG. 22 is a detailed diagram showing connection states of stroke data.

The straight line 12 which passes through the point P and is parallel with the straight line $\alpha\delta$, and the straight line 15 which passes through the point P and is parallel with the straight line $\alpha\beta$, are known. Therefore, by solving the two equations with respect to x and y, the crossing point can be obtained, and a point Q after the shape of face was mofidied with respect to the point P can be obtained. In FIG. 25, an example of the projections to two directions has been mentioned. It is also possible to map into an ellipse or sphere. After the base skeleton data is modified, the data is actually formed. In step S24-4, the data of one stroke is read from the base skeleton data. In this instance, the data is sequentially taken out from the high-priority type style data. As described above, since there are five priorities, the highest priority stroke data is first accessed. If a plurality of highest priority stroke data exist, the stroke data is sequentially read in accordance with the storing order. In step S24-5, the data in the start portion is read. In this instance, by referring to the start portion connection information of the base skeleton data portion, the start data as a target is extracted from a group of start data of the elements in FIG. 18. Since the access No. to the target start data has been stored in the base skeleton data portion, it is sufficient to extract the data corresponding to the access No. In step S24-6, a thickness of stroke is adjusted with reference to the family data of the input parameters. Since the thickness coefficient parameters are written in accordance with the kind of family as shown in FIG. 18, the coefficient of the thickness is multiplied by the values of the previous data thickness parameter data (v, w). In step S24-7, the data in the middle portion is accessed. In this processing, the middle portion connection data stored in the base skeleton data portion is accessed, and the data corresponding to such data is read out from the type style data. In step S24-8, the actual thickness is obtained by multiplying the thickness parameter from the designated family data. In step S24-9, the data in the end portion is accessed. In this processing as well, in a manner similar to the case where the data in the start portion or middle portion was accessed, the end portion connection data in the base skeleton data is first accessed, thereby obtaining the target stroke No. The stroke data corresponding to the stroke No. is read out from the type style data. Further, the thickness is adjusted by the family data (in step S24-10). FIG. 21 shows a connection example of the data in the connecting portion. FIG. 21 shows an example of the connection of the start portion of a horizontal image and the start portion of a vertical image. Generally, the edge portion of the start portion of the horizontal image is extended as a dot placing portion as shown in FIG. 16. In the case of connecting, such an edge portion is unnecessary. Therefore, by holding the start portion whose edge portion is not extended as data, the data can be preferably connected. The result of the connection is as shown in FIG. 22. After the data of one stroke was read as mentioned above, in step S24-11, the data is converted into the intermediate format data shown in FIG. 26. In this instance, one stroke is not converted as one datum into the intermediate format data but the start, middle, and end portions are each set to one stroke and are converted into the intermediate format data. As for a placement offset in the intermediate data format, with reference to the link data with the base stroke in the type style data, reference offset data is obtained and stored in the intermediate data format. The coordinate values of the stroke and the start/end data of the curve are directly stored as stroke data of the intermediate data format. As for angle data, data is stored on the basis of an angle at each stroke point after the modification is performed in step S24-3. As for the width data, the values of (v, w) are directly stored. As mentioned above, the data in each of the start, middle, and end portions is stored as one stroke. As mentioned above, the data of each stroke is formed. In step S24-12, a check is made to see if a distortion occurs after the development or not. In the case where it is known that a pair of strokes which don't relate to the connection data cross due to the stroke and the width data, it is necessary to change the width of the data of lower priority. In step S24-13, therefore, the parameter is changed to represent the minimum width to avoid contact, thereby changing the width data of the intermediate data format. Data of a stroke pair having a possibility such that it may come into contact with the hint data portion of the intermediate data format is stored. Such stroke pair information is used as information to prevent the contact or crossing after the scaling is performed. In step S24-14, a check is made to see if the processings have been finished for all of the base skeleton data shown in FIG. 15 or not. If YES, the processing routine is finished. When data to be processed still exists, the processing routine is returned to step S24-4, the next stroke data is read, and the processings are repeated.

Figure 27:
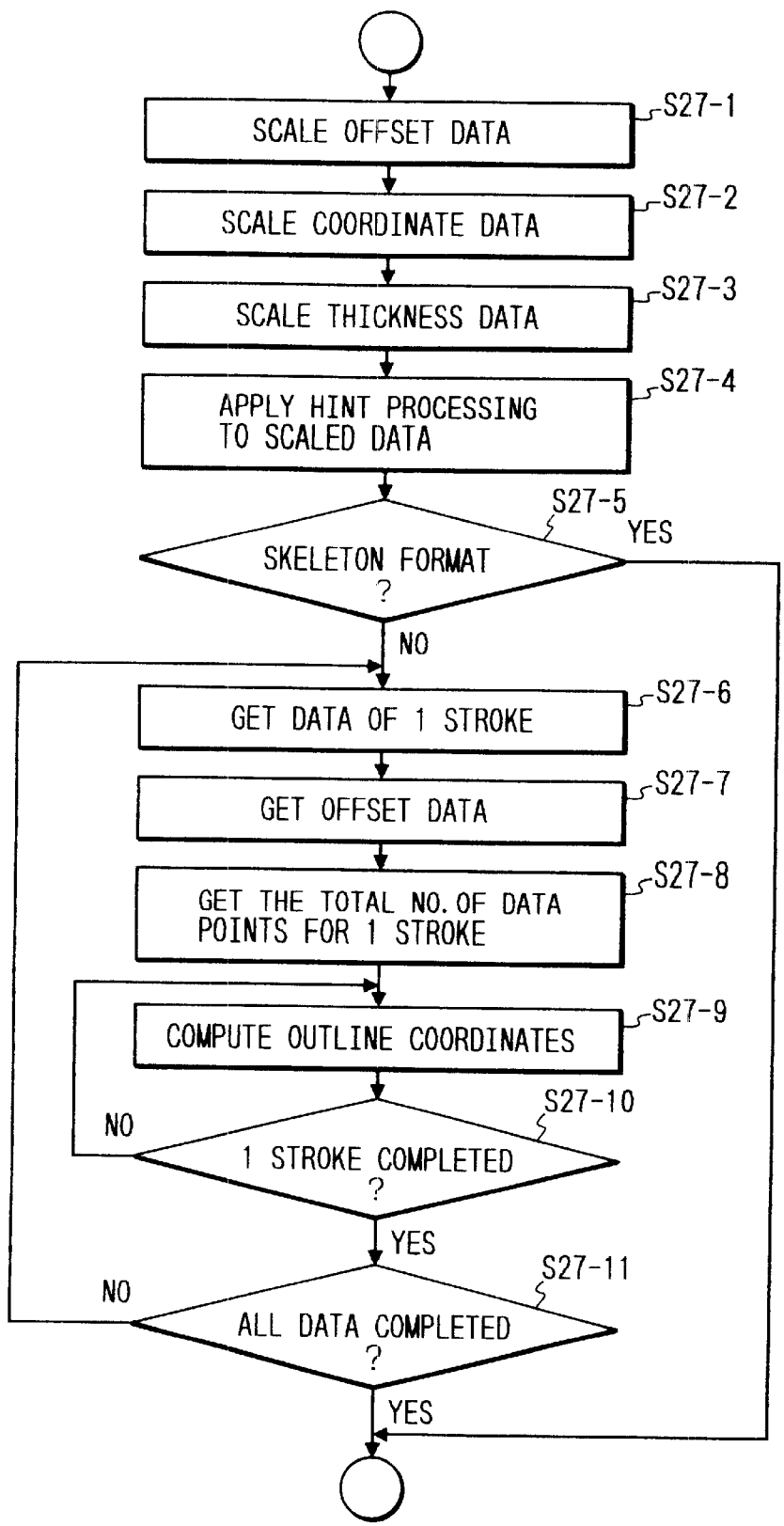
FIG. 27 is a flowchart for a scaling processing in step 23-3 in the flowchart of FIG. 23.

The processing in step S23-3 in FIG. 23 will now be described in detail. FIG. 27 is a flowchart showing in detail the flow of step S23-3. As input data in this instance, there are intermediate format data, scaling parameter, output format, and the like shown in FIG. 26. In step S27-1 in FIG. 27, the offset data of each stroke is enlarged or reduced in accordance with the scaling parameter. At this time, when an output format indicates a bit map, the calculation is executed by the scaling parameter. When the output format indicates a byte map, the scaling parameter is set to two times, three times, or the like, thereby changing to the size to form a gray scale font. Namely, by enlarging or reducing the placement head coordinates of each element or radical, the placement head coordinates of the element after completion of the scaling is decided. In step S27-2, the coordinate data is enlarged or reduced in accordance with the scaling parameter. Namely, by enlarging or reducing the skeleton data starting from the offset data, the placement coordinates of the actual scaled skeleton are determined. In step S27-3, the thickness data is enlarged or reduced in accordance with the scaling parameter. Namely, by enlarging or reducing the thickening data for the skeleton, the width of element for the actual scaled skeleton is decided. In step S27-4, a hint processing is executed to the scaled data. Specifically speaking, there are a spatial processing, a fine adjustment after completion of the thickening process, and the like. In the spatial processing, there is a case where elements are come into contact with each other or are extremely away from each other due to an influence by a processing to round to the nearest whole number upon scaling. To set the coordinate values at that time to normal values, a distance of the coordinates between the elements has previously been held and its value is scaled, thereby finely adjusting the placement head coordinate values of the element or radical. In the thickening adjustment, when the width is equal to a value of an odd number as a result of the processing to round to the nearest whole number upon scaling, it is sufficient to extend by the same distance to both sides of the skeleton around the skeleton as a center. However, when the width is equal to an even number as a result of rounding to the nearest whole number upon scaling, one of the sides of the skeleton as a center becomes long. Therefore, a decision is made with respect to which one of the sides of the skeleton as a center should be made long with reference to the hint data previously stored. In step S27-5, the kind of output format in the processing is judged by the input parameter. In the case of the skeleton format, the results of the processings up to step S27-4 are generated, and the processing routine is finished. In the case of the outline type output format, step S27-6 follows. The outline data is formed on a stroke unit basis in steps S27-6 to S27-11. In step S27-6, the data after completion of the scaling is first searched and the stroke data as a target is fetched. As a searching method of the target stroke data, in the case where the operator wants to access the first stroke data in the intermediate format in FIG. 26, the first pair in an array of the pairs each comprising the placement offset and the pointer to the stroke data is accessed, and the pointer to the stroke data is referred to. By this reference to the address which is indicated by the pointer to the stroke data, the stroke data stored there is obtained. In step 27-7, the offset data at the placement position in the array of the pairs is stored. The head coordinates to be arranged of each stroke are obtained by the offset data. In step S27-8, the total number of data of one stroke is obtained from the one stroke data read in step S27-6. As a total number of data of one stroke, the total number of data of one stroke stored there has been stored in one head word of the stroke data shown in FIG. 26. In steps S27-9 and S27-10, the actual outline coordinates are obtained. In step S27-9, the stroke coordinates (x, y), width data (w), and angle (θ) are first obtained from the one stroke coordinates. Two coordinates of the outline are obtained from three data. Now, assuming that those two coordinates are set to a and b, they have the following values:

$$a=(x+w/2\times\cos\theta,\ y+w/2\times\sin\theta)$$

$$b=(x-w/2\times\cos\theta,\ y-w/2\times\sin\theta)$$

Two coordinates must be stored in accordance with the order of the outlines. As a storing order, a points from the total number (n) of data and the outline coordinate number (m) are stored into the m-th area. Likewise, b points are stored into the (2n−m+1)th area. A flag of an outline start point is added to the first point coordinates. A flag of an outline end point is added to the 2n-th point coordinates. With regard to curve start/end points, when two points of a and b are stored, in the case where they are stored into the first to n-th areas like the a coordinates, a curve attribute which the coordinates at that time have is succeeded as it is. On the other hand, when storing into the (n+1)th to 2n-th areas like the b coordinates, a start flag of the curve is inverted into an end flag and the end flag is inverted into the start flag and the data is stored. In step S27-10, when the processings of the outlines have been finished for all of the data of one stroke, the processing routine advances to step S27-11. If NO, the processing routine is returned to step S27-9 and the processings are repeated until the outline processings for all of the data of one stroke are finished. FIG. 28 shows a state of the above processings. A skeleton in FIG. 28 is constructed by four points and the a coordinates and b coordinates generated from the respective points are set to $a_1$ to $a_4$ and $b_1$ to $b_4$, respectively. The outline start/end points and the curve start/end points are as shown in an outline table. In step S27-11, a check is made to see if the processings have been finished for all of the strokes of one character or not. If YES, the processing routine is finished. If the data of the strokes to be processed still remains, step S27-6 follows and the above processing routine is repeated until the processings are finished for all of the strokes.

Figure 30:
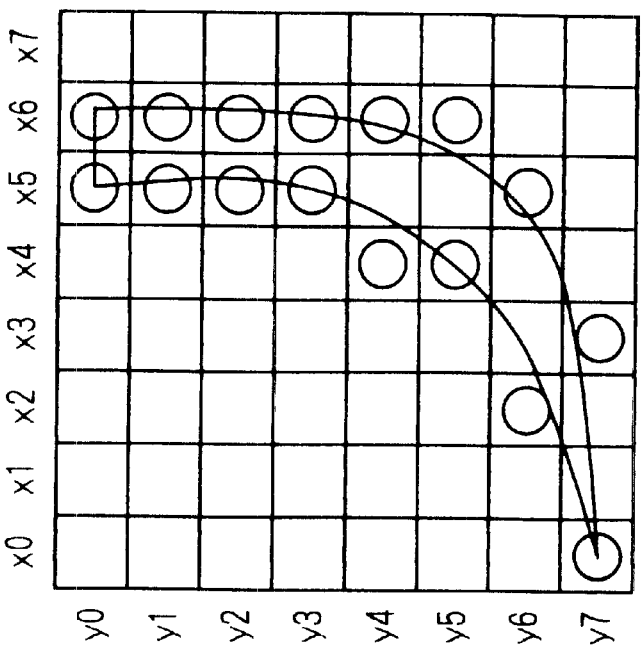
FIG. 30 shows a paint table.
Figure 31:
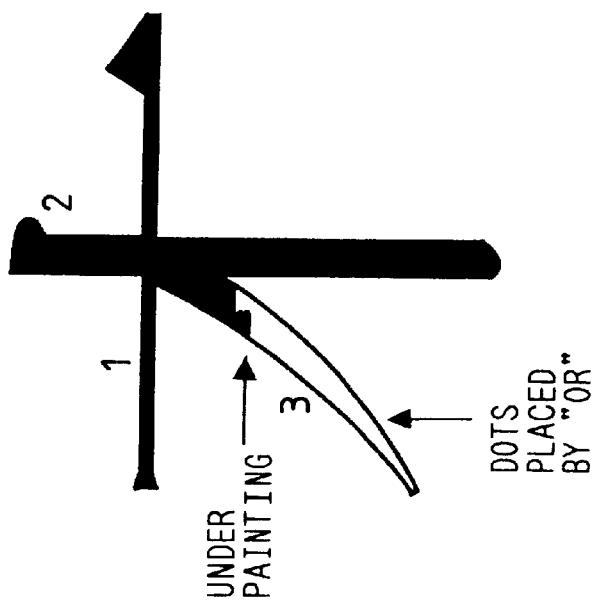
FIG. 31 is a diagram showing a state in which a region in an OR plane is being painted from the paint table.
Figure 32:
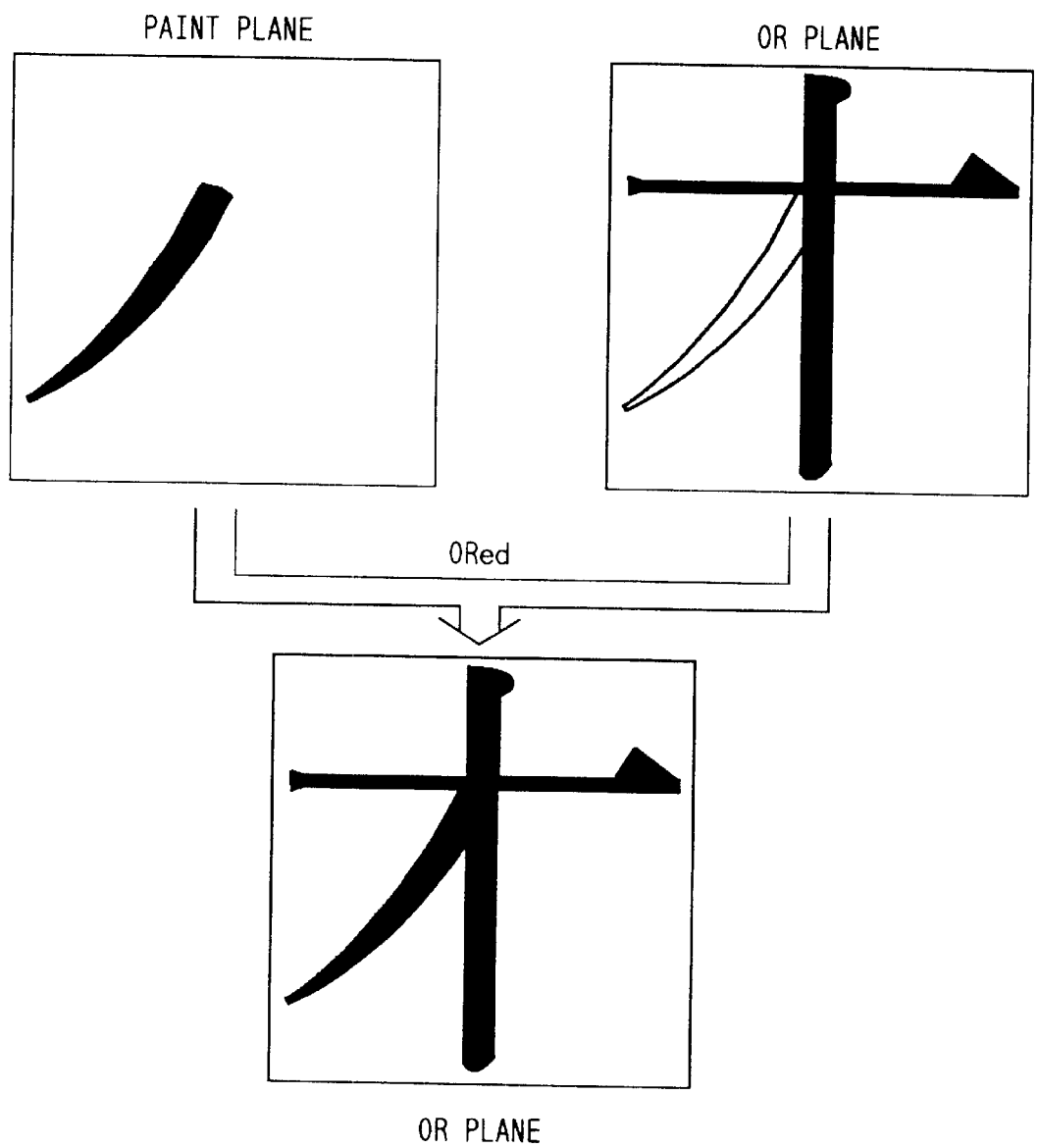
FIG. 32 is a diagram showing a state in which the OR is calculated between a paint plane and an OR plane.

The processing in step S23-4 in FIG. 23 will now be described. FIGS. 29A and 29B flowcharts showing in detail a flow in step S23-4. As input data in this instance, there are a data format after the scaling, an output format, output vertical/horizontal sizes, and the like. First, in step S29-1 in FIG. 29A, the processings are separated in accordance with the output data format. When an output format is requested as data of (skeleton+thickness) or outline coordinate type, the scaled data has already been formed in accordance with the format of the data request in step S27-5 in FIG. 27. Therefore, the pointer of the stored data is generated and the processing routine is finished. In step S29-2, a check is made to see if the data type is the (skeleton+thickness) type or the outline coordinate type. In case of the (skeleton+thickness) type or outline coordinate type. In case of the (skeleton+thickness) type, step S29-3 follows. In case of the outline coordinate type, step S29-15 follows. The fonts corresponding to each of the data types are formed. The formation of the fonts in the data type of the (skeleton+thickness) type in steps S29-3 to S29-14 will now be described. In step S29-3, the data of one stroke is fetched. A method of extracting the data in this instance is similar to that in step S27-6 in FIG. 27. In step S29-4, the outline coordinates are calculated from the skeleton type coordinates. A method of calculating the outline coordinates is similar to the method mentioned in the processing in step S27-9. In step S29-5, whether the target data indicates a straight line or a curve, is discriminated from the outline coordinate values stored in the step S29-4. In case of a straight line, step S29-6 follows. In the case of a curve, step S29-8 follows. In step S29-6, the straight line is not directly placed into the memory but a table that is necessary to paint is formed from the coordinates of two points indicative of the straight line. As shown in FIG. 30, as a painting table, the x coordinate values are stored one by one for one y coordinate value so that the y coordinate value is not skipped. Namely, the painting table is a table to paint a region between two x coordinate values stored in the table when scanning in each y coordinate. In this instance, no dot is placed in the memory plane as shown in FIG. 30. However, as will be explained in detail with respect to the data of the outline type, it is also actually possible to place dots onto the memory plane and to process. In step S29-7, dots of the straight line are placed onto the actual memory plane by means of a logical operation "OR" in order to generate an outline. As a method of placing dots in this case, the dots are not placed one by one for each y coordinate but dots of all of the x coordinates regarding the y coordinate are placed. For example, in the case of FIG. 30, when attention is paid to y5, although the paint table relates to x4 and x6 as targets, dots are placed into the portions of (x4, y5), (x5, y5), and (x6, y5) on the memory plane. By executing the above processing, extinction of an edge point or line or the like can be prevented. Step S29-8 relates to a processing in the case where the target data is decided to be a curve in step S29-5. In case the curve data as it is, it is unknown to which positions on the memory the dots are placed. Therefore, the curve data is divided into sets of short straight lines. As curve data in this instance, the data can be expressed by any curve such as tertiary spline function, B spline function, tertiary Bezier function, secondary Bezier function, arc, or the like. After the above curve function is converted into a set of short vectors, a paint table is formed in step S29-9. Dots are placed onto an OR plane in step S29-10. The processings in steps S29-9 and S29-10 are substantially the same as those in steps S29-6 and S29-7 mentioned above. In step S29-11, a check is made to see if the processings have been finished for all of the straight lines formed in step S29-8 or not. When the short vectors to be processed still exist, the processing routine is returned to step S29-9 and the processing is executed. When the processings are finished for all of the short vectors, step S29-12 follows. In step S29-12, a check is made to see if the processings in steps S29-5 to S29-11 have been finished for one skeleton data or not. If NO, the processing routine is returned to step S29-5 and similar processings are again repeated. If YES, the stroke comprising one skeleton is painted on the basis of the paint table formed in the above processings. In this instance, the stroke is painted in the memory area in the memory in which only the outline has been drawn by the "OR" placing operation. FIG. 31 shows a state in this instance. FIG. 31 shows a state in which the data is "木" (which reads "ki" and means "tree"). The formation of each of the portions 1 and 2 shown in FIG. 31 has already been finished. In the portion 3, the placing operation by "OR" has already been finished and a state in which the painting operation is being executed on the basis of the paint table is shown. The paint table and the offset value of the skeleton are added and the portion between two x coordinates in the paint table is painted. For example, when an attention is paid to y2, the bit between the (x4+x) offset of the line of the (y2+y) offset and the (x6+x) offset is set to 1. After the paint processing was finished, step S29-14 follows and a check is made to see if the processings for all of the data of one character have been finished or not. If YES, step S29-27 follows. If NO, the processing routine is returned to step S29-3 and the above processings are repeated until the processings for all of the skeleton data are finished. The processings in case of the skeleton data type are described above. The case where the data type is the outline type will now be described in accordance with the processings in steps S29-15 to S29-26. In step S29-15, the outline data of one stroke is read. The data of one stroke has the data format as described in FIG. 28. In step S29-16, a check is made to see if the data as a target indicates a straight line or a curve. When the target data indicates a straight line, step S29-17 follows. When it indicates a curve, step S29-19 follows. In step S29-17, a dot of one x coordinate is placed to one y coordinate with regard to one straight line as shown in the paint plane of FIG. 30. Although the painting table is not used in this instance, the processings can also be performed by using the painting table in a manner similar to the case described in detail with respect to the data of the skeleton type. In step S29-18, dots are placed onto the OR plane. A dot placing state at this time is similar to that described in the case of the skeleton type data in step S29-7. Step S29-19 relates to the case where the current target data indicates a curve. Since the dot placing operation cannot be directly performed in case of the curve as it is, the curve data is converted into the straight line data and a set of short vectors are formed. In steps S29-20 and S29-21, dots are placed to the paint plane and the OR plane. A dot placing method at this time is substantially similar to that described in steps S29-17 and S29-18. In step S29-22, a check is made to see if the processings for all of the data of the set of short vectors have been finished or not. If YES, step S29-23 follows. If the data to be processed still exists, the processing routine is returned to step S29-20 and the processing routine is repeated until the processings for all of the data of the short vectors are finished. In step S29-24, the paint processing is executed for the region in the paint plane. In the paint processing in this instance, a scanning operation is executed from the left side of each line to the right side and the dots in a range from the black dot which was found out at the first time to the black dot which is found out at the next time are all converted into black dots. The scanning operation is further performed for such a line. The dots in a range from the next black dot which was found out next to the black dot which is subsequently found out are all converted into black dots. Similar processings are repeated hereinbelow. The processing routine is repeated until the processings for all of the lines are finished. In step S29-25, the paint pattern formed in step S29-24 is transferred to the OR plane. As a transfer method at this time, the data is transferred while getting the "OR" with the data which has already existed on the OR plane. FIG. 32 shows a state in this instance. In step S29-26, a check is made to see if the processings for all of the data of one character have been finished or not. If YES, step S29-27 follows. If the data to be processed still exists, the processing routine is returned to step S29-15 and the data of a stroke is again read, thereby making bit map font data. As mentioned above, the bit map is formed from the skeleton data by the processings in steps S29-3 to S29-14. The bit map is formed from the outline data of the stroke by the processings in steps S29-15 to S29-26. In this embodiment, in the case of skeleton type data, the painting operation is executed by using the paint table. In the case of outline type data of the stroke, the painting operation is executed by actually placing the dots onto the memory plane. In the painting method, however, a discrimination regarding whether the painting table is used or the dots are placed to the memory plane, doesn't depend on the skeleton data or the outline data of the stroke. Therefore, it is possible to use any one of the data types and any one of the processing methods. In steps S29-27 and S29-28, a check is made to see if the data of the bit map formed is converted into the data of the byte map format by an output format or not. First, in step S29-27, a check is made to see if the output request instructs the byte map or the bit map with reference to the output request parameter. In a case of the byte map request, step S29-28 follows. In the case of the bit map, the processing routine is finished there. In step S29-28, a gray scale font is formed from the bit map font. In the processing at this time, since a bit map that is slightly larger on the order of two or three times of the size of the final output request is formed upon scaling, the data of the gray scale font is formed on the basis of the data of such a large bit map. The processing method in this case is omitted here because it has been described in detail in JP-A-3-154096. The gray scale font is formed here and the forming processing of the data such as a bit map or the like in FIGS. 29A and 29B is finished.

The processing in step S23-5 in FIG. 23 will now be described. In this step, a processing to transfer the data to the requesting side in accordance with the output request on the requesting side. Since the font corresponding to the output request on the requesting side is developed in steps S23-3 and S23-4, any processings other than the processing to transfer the data to the buffer designated by the requesting side are not executed. An output example on the requesting side will now be described. For instance, in the case of a printer output of an LBP, thermal jet pritner (TJ), or the like, the printer generates a request for the bit map. Therefore, the processings until the bit map development are executed in the processing routine of FIGS. 29A and 29B and the data is returned to the printer side. In the case of the output request from the display such as a CRT or the like, the bit map or gray scale font is requested in accordance with the output size or display speed. Therefore, the bit map development or byte map development processing is executed in the processing routine of FIGS. 29A and 29B and the data is returned to the display. In the case where an output device generates a request such that the data is converted into the data of a postscript format and is generated, the outline type data is requested. Therefore, the data is returned while the outline type format is set to an output in the processing routine of FIGS. 29A and 29B. In case of transferring the data to an ASIC or the like to realize a high processing speed, it is necessary to convert the data into the data of the format according to the requested specifications of the ASIC. Therefore, when the requested specification of the ASIC indicates the outline type, the the data format of the outline type is generated in the processing routine of FIGS. 29A and 29B. When the requested specification of the ASIC indicates the format of (skeleton+thickness), the data format of (skeleton+thickness) is generated and the data is returned.

According to the invention as described in detail above, by providing the base data stroke portion and the type style parameter, even in case of installing a plurality of type styles or families, the data capacity of the ROM of the product can be reduced. Further, since the development is executed in accordance with the requested format, a character generating method which can be applied to any output apparatus can be provided.

Constructions of a laser beam printer and an ink jet printer other than a computer will now be described with reference to FIGS. 33 and 34 as practical examples to which the character generating method of the embodiment can be applied. The printer to which the embodiment is applied is not limited to the laser beam printer and ink jet printer but can be applied to any printers of the other printing systems.

Figure 33:
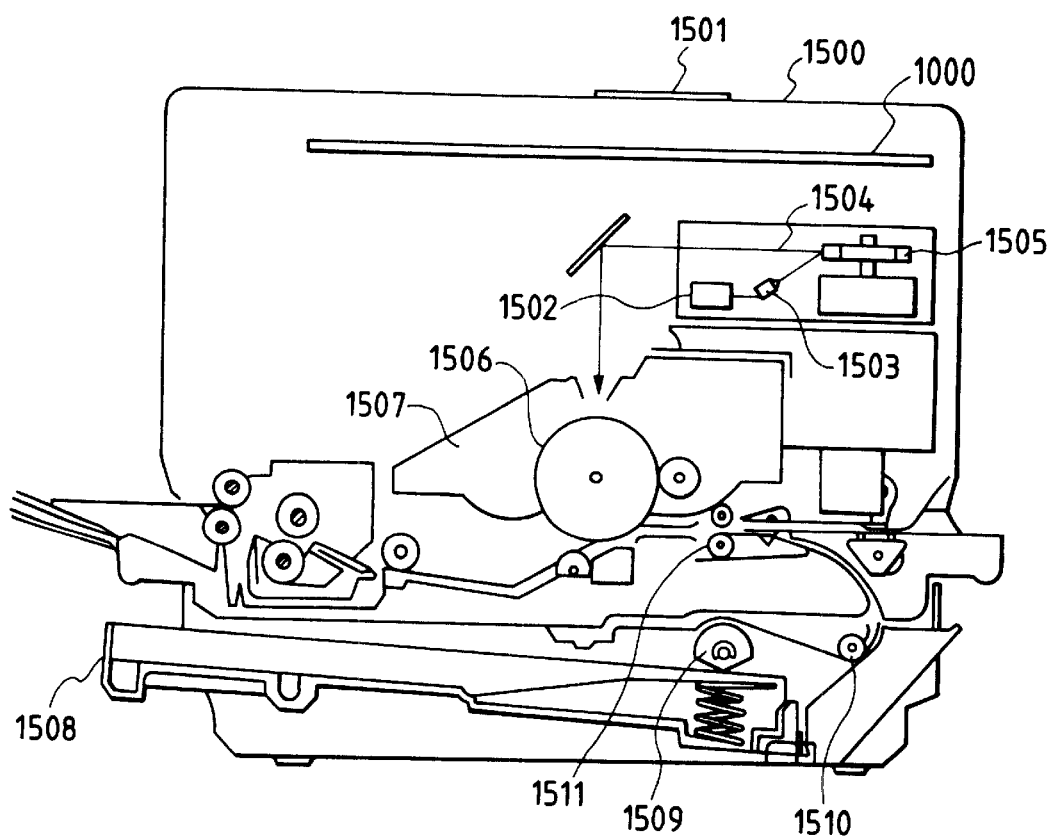
FIG. 33 is a constructional diagram of a laser beam printer.

FIG. 33 is a cross-sectional view showing a construction of the first recording apparatus to which the invention can be applied. For example, FIG. 33 shows the case of a laser beam pritner (LBP).

In the diagram, reference numeral 1500 denotes an LBP main body. The LBP 1500 receives and stores print data (character code and the like), form data, macro instruction, and the like which are supplied from a host computer connected to the outside. In accordance with those data, the LBP forms the corresponding character pattern, form pattern, and the like and forms an image onto a recording paper as a recording medium. Reference numeral 1501 denotes an operation panel on which switches for operations, an LED display, and the like are arranged. Reference numeral 1000 denotes a printer control unit to control the whole LBP main body 1500 and to analyze the character data or the like which is supplied from the host computer. The printer control unit 1000 mainly converts the character data into the video signal of the corresponding character pattern and supplies the video signal to a laser driver 1502. The laser driver 1502 is a circuit to drive a semiconductor laser 1503. In accordance with the inputted video signal, the laser driver 1502 on/off switches a laser beam 1504 which is emitted from the semiconductor laser 1503. The laser beam 1504 is swung to the right and left by a rotary polygonal mirror 1505 and scans on an electrostatic drum 1506 and exposes the drum 1506. Thus, an electrostatic latent image of the character pattern is formed on the drum 1506. The latent image is developed by a development unit 1507 arranged around the drum 1506 and is copy transferred onto the recording paper after that. Cut sheets are used as recording papers. The cut sheet recording papers are enclosed in a sheet cassette 1508 set in the LBP main body 1500. The cut sheets are picked up one by one and conveyed into the apparatus main body by a feed roller 1509 and conveying rollers 1510 and 1511 and fed to the drum 1506.

Figure 34:
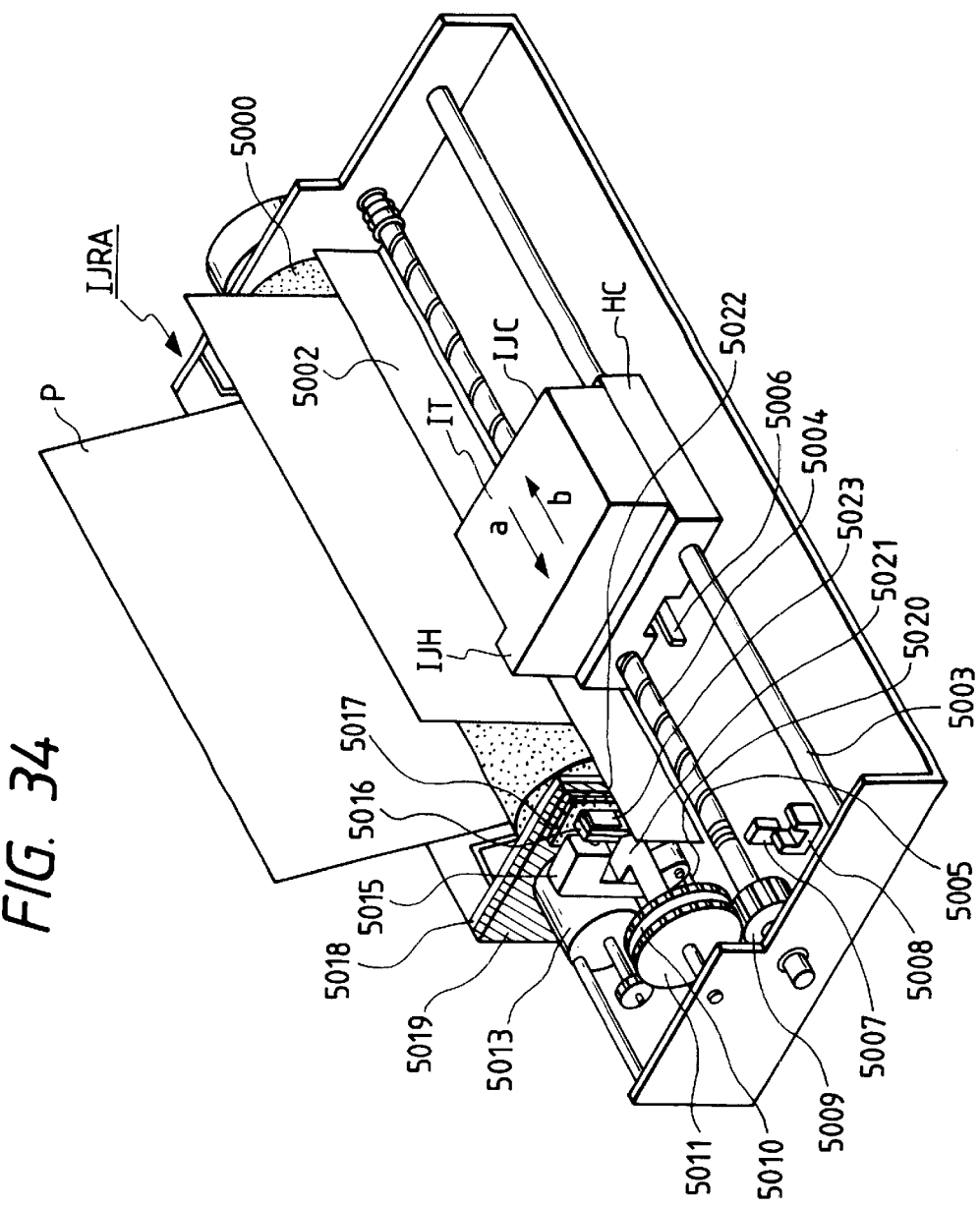
FIG. 34 is a constructional diagram of a bubble jet printer.

FIG. 34 is an external view showing a construction of the second recording apparatus to which the invention can be applied. For example, FIG. 34 shows the case of an ink jet recording apparatus (IJRA).

In the diagram, a lead screw 5005 is rotated in association with the forward/backward rotation of a driving motor 5013 through driving force transfer gears 5011 and 5009. A carriage HC has a pin (not shown) which come into engagement with a spiral groove 5004 of the lead screw 5005. The carriage HC is reciprocated in the directions shown by arrows a and b. An ink jet cartridge IJC is mounted on the carriage HC. Reference numeral 5002 denotes a paper pressing plate to press the paper onto a platen 5000 in the carriage moving direction. Reference numerals 5007 and 5008 denote photocouplers which function as home position detecting means for detecting the existence of a lever 5006 of the carriage in a region of the photocouplers, thereby performing a switching operation of the rotating direction of the motor 5013 or the like. Reference numeral 5016 denotes the member to indicate a capping member 5022 to cap the whole surface of a recording head; and 5015 is sucking means for sucking air from the cap. The sucking means executes a sucking recovery of the recording head through an opening 5023 in the cap. Reference numeral 5017 denotes a cleaning blade which can be moved in the front/back direction by a member 5019; 5018 a main body supporting plate to support the cleaning blade 5017 and the member 5019; and 5021 a lever to start the sucking operation in the sucking recovery. The lever 5021 moves in association with the movement of a cam 5020 which is come into engagement with the carriage. A driving force from the driving motor is transferred and controlled by well-known transfer means such as a clutch switching device or the like.

Any desired one of the processes such as capping, cleaning, and sucking recovery can be performed at the corresponding position by the operation of the lead screw 5005 when the carriage arrives at the home position side region. It is sufficient to construct such that a desired operation is executed at a well-known timing.

According to the invention as mentioned above, by providing the base stroke data and type style data, it is sufficient to use one base stroke data irrespective of the number of type styles which are installed. By providing the type style data of the number as many as the number of type styles, the memory capacity of the ROM which is installed in the product can be reduced without deterioration of the output quality.

According to the invention, by converting the stroke type data into the outline type data, the character development can be executed in accordance with the requested output format.

According to the invention, it is possible to provide a character generating method for generating a plurality of type styles by providing two kinds of base skeleton data and data which depends on the type style in case of generating a character from the data stored in the vector format.

What is claimed is:

1. A character processing apparatus comprising:

a memory means for storing (1) base skeleton data including a plurality of stroke data specifying strokes of a corresponding character, each stroke including start, middle and end portions, and (2) a plurality of stroke element data, each including for one of the strokes (a) coordinate information of the start, middle and end portions, (b) thickness information of the start, middle and end portions, and (c) a plurality of coefficients corresponding to family information;

an adjustment means for reading the base skeletal data and the plurality of stroke element data stored in said memory means and for adjusting, for each stroke, the thickness information of the start, middle and end portions of the stroke based on one of the plurality of coefficient corresponding to the family information of an input parameter; and a generation means for generating a character pattern based on the thickness information of the start, middle and end portions of each stroke adjusted by said adjustment means and based on the coordinate information of each stroke stored in said memory means.

2. An apparatus according to claim 1, further comprising a discrimination means for discriminating whether a distortion is produced after said generation means generates the character pattern, and a change means for changing the width of a stroke having a lower priority when said discriminating means discriminates that the distortion is produced.

3. An apparatus according to claim 1, wherein said stroke generation means determines coordinates of an outline of a stroke based on the coordinate information for the stroke to be generated and the width information for the stroke adjusted by said adjustment means, generates a paint table based on the determined stroke outline coordinates, and generates a stroke pattern based on the generated paint table.

4. An apparatus according to claim 1, further comprising means for printing the character pattern generated by said generation means.

5. An apparatus according to claim 1, further comprising means for displaying the character pattern generated by said generation means.

6. A character processing method using a memory which stores (1) base skeleton data including a plurality of stroke data specifying strokes of a corresponding character, each stroke including start, middle and end portions, and (2) a plurality of stroke element data, each including for one of the strokes (a) coordinate information of the start, middle and end portions, (b) thickness information of the start, middle and end portions, and (c) a plurality of coefficients corresponding to family information, said method comprising the steps of:

reading the base skeletal data and the plurality of stroke element data stored in the memory and adjusting, for each stroke, the thickness information of the start, middle and end portions of the stroke based on one of the plurality of coefficients corresponding to the family information of an input parameter; and generating a character pattern based on the thickness information of the start, middle and end portions of each stroke adjusted in said adjusting step and based on the coordinate information of each stroke stored in said memory means.

7. A method according to claim 6, further comprising a discrimination step, of discriminating whether a distortion produced after generation of the character pattern in said generation step, and a change step, of changing the width of a stroke having a lower priority when it is discriminating, said discrimination step discriminating that the distortion is produced.

8. A method according to claim 6, wherein said generating step includes determining coordinates of an outline of a stroke based on the coordinate information for the stroke to be generated and the width information for the stroke adjusted in said adjusting step, generating a paint table based on the determined stroke outline coordinates, and generating a stroke pattern based on the generated paint table.

9. A method according to claim 6, further comprising the step of printing the generated character pattern generated in said combining step.

10. A method according to claim 6, further comprising the step of displaying the generated character pattern generated in said combining step.

11. A storage medium containing computer readable code which, upon execution, will cause a character processing apparatus to perform a character processing method, the character processing apparatus having a memory which stores (1) base skeleton data including a plurality of stroke data specifying strokes of a corresponding character, each stroke including start, middle and end portions, and (2) a plurality of stroke element data each including for one of the strokes (a) coordinate information of the start, middle and end portions, (b) thickness information of the start, middle and end portions, and (c) a plurality of coefficients corresponding to family information, wherein the character processing method comprises the steps of:

reading the base skeletal data and the plurality of stroke element data stored in the memory and adjusting, for each stroke, the thickness information of the start, middle and end portions of the stroke based on one of the plurality of coefficients corresponding to the family information of an input parameter; and generating a character pattern based on the thickness information of the start, middle and end portions of each stroke adjusted in said adjusting step and based on the coordinate information of each stroke stored in said memory means.

12. A storage medium according to claim 11, further comprising a discrimination step, of discriminating whether a distortion is produced after generation of the character pattern in said generation step, and a change step, of changing the width of a stroke having a lower priority when it is discriminating, said discrimination step discriminating that the distortion is produced.

13. A storage medium according to claim 11, wherein the generating step includes determining coordinates of an outline of a stroke based on the coordinate information for the stroke to be generated and the width information for the adjusted stroke, generating a paint table based on the determined stroke outline coordinates, and generating a stroke pattern based on the generated paint table.

14. A storage medium according to claim 11, further containing code which upon execution will cause the character processing apparatus to perform the step of printing the generated character pattern generated in the combining step.

15. A storage medium according to claim 11, further containing code which upon execution will cause the character processing apparatus to perform the step of displaying the generated character pattern generated in said combining step.

16. A computer program product for implementing a method on a character processing apparatus having a memory which stores (1) base skeleton data including a plurality of stroke data specifying strokes of a corresponding character, each stroke including start, middle and end portions, and (2) a plurality of stroke element data, each including for one of the strokes (a) coordinate information of the start, middle and end portions, (b) thickness information of the start, middle and end portions, and (c) a plurality of coefficients corresponding to family information, the method comprising the steps of:

reading the base skeletal data and the plurality of stroke element data stored in the memory and adjusting, for each stroke, the thickness information of the start, middle and end portions of the stroke based on one of the plurality of coefficients corresponding to the family information of an input parameter; and generating a character pattern based on the thickness information of the start, middle and end portions of each stroke adjusted in said adjusting step and based on the coordinate information of each stroke stored in the memory.

* * * * *

UNITED STATES PATENT AND TRADEMARK OFFICE
CERTIFICATE OF CORRECTION

PATENT NO. : 6,577,314 B1  Page 1 of 1
DATED : June 10, 2003
INVENTOR(S) : Masayuki Yoshida et al.

It is certified that error appears in the above-identified patent and that said Letters Patent is hereby corrected as shown below:

<u>Column 15,</u>
Line 29, "start." should read -- start, --;
Line 40, "produced" should read -- is produced --;

Signed and Sealed this

Thirtieth Day of March, 2004

JON W. DUDAS
*Acting Director of the United States Patent and Trademark Office*